US011074467B2

(12) United States Patent
He et al.

(10) Patent No.: US 11,074,467 B2
(45) Date of Patent: Jul. 27, 2021

(54) ANTI-SPOOFING OF TRANSPARENT FAKE OBJECT OVERLAYS WITH OPTICAL SENSING MODULES

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 117 days.

(21) Appl. No.: 16/705,183

(22) Filed: Dec. 5, 2019

(65) Prior Publication Data
US 2021/0174105 A1  Jun. 10, 2021

(51) Int. Cl.
*G06K 9/00* (2006.01)
*G06K 9/52* (2006.01)
*G06K 9/62* (2006.01)

(52) U.S. Cl.
CPC ....... *G06K 9/00899* (2013.01); *G06K 9/0004* (2013.01); *G06K 9/52* (2013.01); *G06K 9/6212* (2013.01)

(58) Field of Classification Search
CPC .... G06K 9/00899; G06K 9/6212; G06K 9/52; G06K 9/0004
See application file for complete search history.

(56) References Cited

U.S. PATENT DOCUMENTS

| 6,292,576 B1* | 9/2001 | Brownlee | G06K 9/00006 |
| | | | 340/5.83 |
| 6,628,809 B1* | 9/2003 | Rowe | A61B 5/0059 |
| | | | 382/115 |
| 2016/0026884 A1 | 1/2016 | Ferren | |
| 2016/0117544 A1 | 4/2016 | Hoyos et al. | |
| 2016/0125178 A1* | 5/2016 | Danikhno | G06F 16/00 |
| | | | 726/18 |

(Continued)

FOREIGN PATENT DOCUMENTS

| CN | 108491768 A | 9/2018 |
| CN | 108549867 A | 9/2018 |

(Continued)

*Primary Examiner* — John B Strege
(74) *Attorney, Agent, or Firm* — Kilpatrick Townsend & Stockton LLP

(57) ABSTRACT

Optical sensing is provided for anti-spoofing of transparent spoof overlay material using pixel spreading detection. Some embodiments operate in context of an under-display optical fingerprint sensor integrated into an electronic device. An optical scanning system can direct illumination incident on a sensing region, which is redirected, by specular reflection off of a contact surface, onto an optical sensor in a predictable manner. When an object (e.g., finger) is in direct contact with a contact surface, the predictable specular correspondence is maintained. However, when a transparent spoof material is placed between the object and the contact surface, the spoof material produces additional specular and non-specular reflection, resulting in pixel spreading at the optical sensor. Thus, presence of the spoof material can be detected by detecting such pixel spreading. Some embodiments use illumination masking to help facilitate the pixel spreading detection.

20 Claims, 20 Drawing Sheets

(56) References Cited

U.S. PATENT DOCUMENTS

| | | | | |
|---|---|---|---|---|
| 2018/0285668 A1* | 10/2018 | Li | ............... | G06K 9/6269 |
| 2020/0210738 A1* | 7/2020 | Parupati | ............. | G06K 9/00288 |
| 2020/0401781 A1* | 12/2020 | Haddad | ................ | G06K 9/0008 |
| 2021/0034893 A1* | 2/2021 | Ebihara | .............. | G06K 9/00892 |

FOREIGN PATENT DOCUMENTS

| | | |
|---|---|---|
| CN | 109196524 A | 1/2019 |
| CN | 209560568 U | 10/2019 |
| EP | 2680190 A2 | 1/2014 |

* cited by examiner

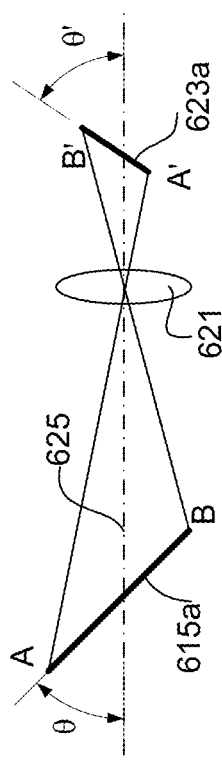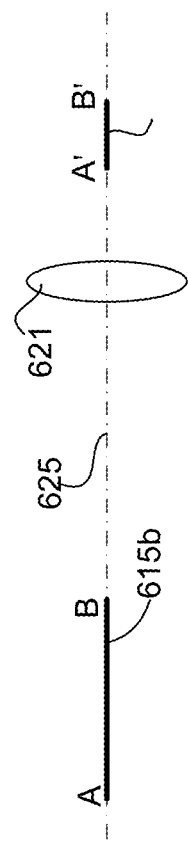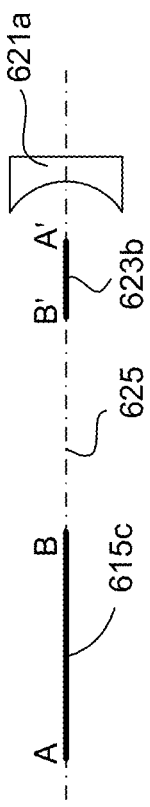

ANTI-SPOOFING OF TRANSPARENT FAKE OBJECT OVERLAYS WITH OPTICAL SENSING MODULES

TECHNICAL FIELD

This disclosure relates to optical sensors, such as an under-screen optical fingerprint sensors integrated with a display panel arrangement of mobile computing device, that are configured to provide anti-spoofing of fake object overlays.

BACKGROUND

Various sensors can be implemented in electronic devices or systems to provide certain desired functions. A sensor that enables user authentication is one example of sensors to protect personal data and prevent unauthorized access in various devices and systems including portable or mobile computing devices (e.g., laptops, tablets, smartphones), gaming systems, various databases, information systems or larger computer-controlled systems.

User authentication on an electronic device or system can be carried out through one or multiple forms of biometric identifiers, which can be used alone or in addition to conventional password authentication methods. A popular form of biometric identifiers is a person's fingerprint pattern. A fingerprint sensor can be built into the electronic device to read a user's fingerprint pattern so that the device can only be unlocked by an authorized user of the device through authentication of the authorized user's fingerprint pattern. Another example of sensors for electronic devices or systems is a biomedical sensor that detects a biological property of a user, e.g., a property of a user's blood, the heartbeat, in wearable devices like wrist band devices or watches. In general, different sensors can be provided in electronic devices to achieve different sensing operations and functions.

Fingerprints can be used to authenticate users for accessing electronic devices, computer-controlled systems, electronic databases or information systems, either used as a stand-alone authentication method or in combination with one or more other authentication methods such as a password authentication method. For example, electronic devices including portable or mobile computing devices, such as laptops, tablets, smartphones, and gaming systems can employ user authentication mechanisms to protect personal data and prevent unauthorized access. In another example, a computer or a computer-controlled device or system for an organization or enterprise should be secured to allow only authorized personnel to access in order to protect the information or the use of the device or system for the organization or enterprise. The information stored in portable devices and computer-controlled databases, devices or systems, may be personal in nature, such as personal contacts or phonebook, personal photos, personal health information or other personal information, or confidential information for proprietary use by an organization or enterprise, such as business financial information, employee data, trade secrets and other proprietary information. If the security of the access to the electronic device or system is compromised, these data may be accessed by others, causing loss of privacy of individuals or loss of valuable confidential information. Beyond security of information, securing access to computers and computer-controlled devices or systems also allow safeguard the use of devices or systems that are controlled by computers or computer processors such as computer-controlled automobiles and other systems such as ATMs.

Secured access to a device (e.g., a mobile device) or a system (e.g., an electronic database and a computer-controlled system) can be achieved in different ways such as the use of user passwords. A password, however, may be easily to be spread or obtained and this nature of passwords can reduce the level of the security of passwords. Moreover, since a user needs to remember a password in accessing password-protected electronic devices or systems, in the event that the user forgets the password, the user needs to undertake certain password recovery procedures to get authenticated or otherwise to regain the access to the device or system. Such processes may be burdensome to users and have various practical limitations and inconveniences. The personal fingerprint identification can be utilized to achieve the user authentication for enhancing the data security while mitigating certain undesired effects associated with passwords.

Electronic devices or systems, including portable or mobile computing devices, may employ user authentication through one or multiple forms of biometric identifiers to protect personal or other confidential data and prevent unauthorized access. A biometric identifier can be used alone or in combination with a password authentication method to provide user authentication. One form of biometric identifiers is a person's fingerprint pattern. A fingerprint sensor can be built into an electronic device or an information system to read a user's fingerprint pattern so that the device can only be unlocked by an authorized user of the device through authentication of the authorized user's fingerprint pattern.

SUMMARY

Embodiments provide optical sensing with anti-spoofing of transparent spoof overlay material using pixel spreading detection. For example, embodiments can operate in context of an under-display optical fingerprint sensor integrated into an electronic device, such as a smartphone. An optical scanning system is configured so that direct illumination incident on a defined sensing region is redirected, by internal specular reflection off of a contact surface, onto an optical sensor in a predictable manner. When a finger, or the like, is in direct contact with a contact surface, the predictable specular correspondence is maintained. However, when a transparent spoof material (e.g., a latex glove, cellophane tape, etc.) is placed between the finger (or other object) and the contact surface, the spoof material produces additional specular and non-specular reflection, resulting in pixel spreading at the optical sensor. Thus, presence of the spoof material can be detected by detecting such pixel spreading. Some embodiments use illumination masking to help facilitate the pixel spreading detection.

BRIEF DESCRIPTION OF THE DRAWINGS

The accompanying drawings, referred to herein and constituting a part hereof, illustrate embodiments of the disclosure. The drawings together with the description serve to explain the principles of the invention.

FIGS. 11A-11C illustrate imaging of the fingerprint sensing area on the top transparent layer via an imaging module under different tiling conditions where an imaging device images the fingerprint sensing area onto an optical sensor array and the imaging device may be optically transmissive or optically reflective according to some embodiments.

Figure 1:
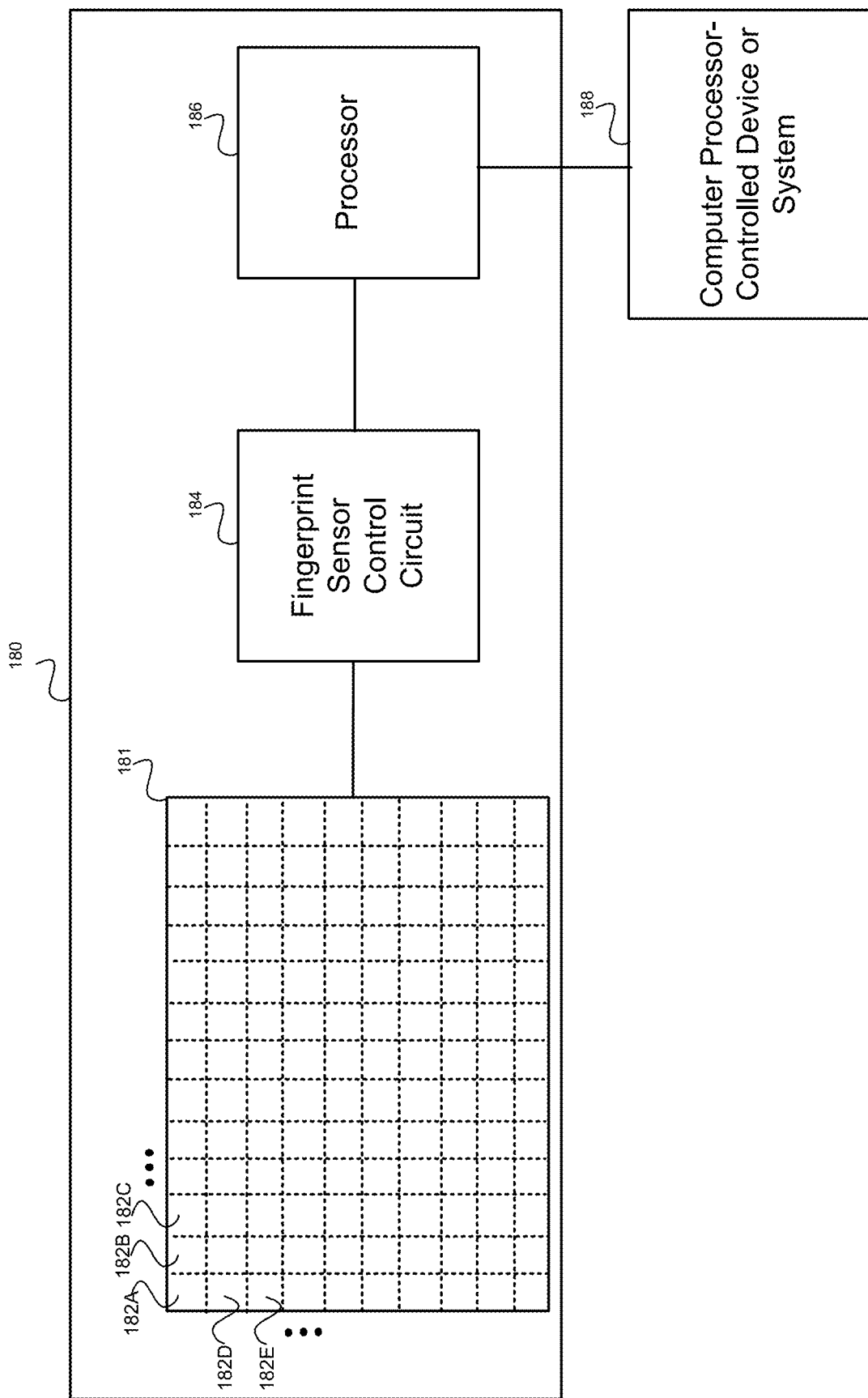
FIG. 1 is a block diagram of an example of a system with a fingerprint sensing module which can be implemented to include an optical fingerprint sensor according to some embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Electronic devices or systems may be equipped with fingerprint authentication mechanisms to improve the security for accessing the devices. Such electronic devices or system may include, portable or mobile computing devices, e.g., smartphones, tablet computers, wrist-worn devices and other wearable or portable devices, larger electronic devices or systems, e.g., personal computers in portable forms or desktop forms, ATMs, various terminals to various electronic systems, databases, or information systems for commercial or governmental uses, motorized transportation systems including automobiles, boats, trains, aircraft and others.

Fingerprint sensing is useful in mobile applications and other applications that use or require secure access. For example, fingerprint sensing can be used to provide secure access to a mobile device and secure financial transactions including online purchases. It is desirable to include robust and reliable fingerprint sensing suitable for mobile devices and other applications. In mobile, portable or wearable devices, it is desirable for fingerprint sensors to minimize or eliminate the footprint for fingerprint sensing given the limited space on those devices, especially considering the demands for a maximum display area on a given device. Many implementations of capacitive fingerprint sensors must be implemented on the contact surface of a device due to the near-field interaction requirement of capacitive sensing.

Optical sensing modules can be designed to mitigate the above and other limitations in the capacitive fingerprint sensors and to achieve additional technical advantages. For example, in implementing an optical fingerprint sensing device, the light carrying fingerprint imaging information can be directed over distance to an optical detector array of optical detectors for detecting the fingerprint without being limited to the near-field sensing in a capacitive sensor. In particular, light carrying fingerprint imagining information can be directed to transmit through the top cover glass commonly used in many display screens such as touch sensing screens and other structures and may be directed through folded or complex optical paths to reach the optical detector array, thus allowing for flexibility in placing an optical fingerprint sensor in a device that is not available for a capacitive fingerprint sensor. Optical fingerprint sensor modules based on the technologies disclosure herein can be an under-screen optical fingerprint sensor module that is placed below a display screen to capture and detect light from a finger placed on or above the top sensing surface of the screen. As disclosed herein, optical sensing can also be used to, in addition to detecting and sensing a fingerprint pattern, optically detect other parameters associated with a user or a user action, such as whether a detected fingerprint is from a finger of a live person and to provide anti-spoofing mechanism, or certain biological parameters of the user.

I. OVERVIEW OF UNDER-DISPLAY OPTICAL SENSING MODULES

The optical sensing technology and examples of implementations described in this disclosure provide an optical fingerprint sensor module that uses, at least in part, the light from a display screen as the illumination probe light to illuminate a fingerprint sensing area on the touch sensing surface of the display screen to perform one or more sensing operations based on optical sensing of such light. A suitable display screen for implementing the disclosed optical sensor technology can be based on various display technologies or configurations, including, a liquid crystal display (LCD) screen using a backlight to provide white light illumination to the LCD pixels and matched optical filters to effectuate colored LCD pixels, or a display screen having light emitting display pixels without using backlight where each individual pixel generates light for forming a display image on the screen such as an organic light emitting diode (OLED) display screens, or electroluminescent display screens. The specific examples provided below are directed to integration of under-screen optical sensing modules with LCD screens and thus contain certain technical details associated with LCD screens although various aspects of the disclosed technology are applicable to OLED screens and other display screens.

A portion of the light produced by a display screen for displaying images necessarily passes through the contact surface of the display screen in order to be viewed by a user. A finger in touch with or near the contact surface interacts with the light at the contact surface to cause the reflected or scattered light at the surface area of the touch to carry spatial image information of the finger. Such reflected or scattered light carrying the spatial image information of the finger returns to the display panel underneath the contact surface. In touch sensing display devices, for example, the contact surface is the touch sensing interface with the user and this interaction between the light for displaying images and the user finger or hand constantly occurs but such information-carrying light returning back to the display panel is largely wasted and is not used in various touch sensing devices. In various mobile or portable devices with touch sensing displays and fingerprint sensing functions, a fingerprint sensor tends to be a separate device from the display screen, either placed on the same surface of the display screen at a location outside the display screen area such as in some models of Apple iPhones and Samsung smartphones, or placed on the backside of a smartphone, such as some models of smart phones by Huawei, Lenovo, Xiaomi or Google, to avoid taking up valuable space for placing a large display screen on the front side. Those fingerprint sensors are separate devices from the display screens and thus need to be compact to save space for the display screens and other functions while still providing reliable and fast fingerprint sensing with a spatial image resolution above a certain acceptable level. However, the need to be compact and small for designing a fingerprint sensor and the need to provide a high spatial image resolution in capturing a fingerprint pattern are in direct conflict with each other in many fingerprint sensors because a high spatial image resolution in capturing a fingerprint pattern based on various suitable fingerprint sensing technologies (e.g., capacitive touch sensing or optical imaging) requires a large sensor area with a large number of sensing pixels.

The sensor technology and examples of implementations of the sensor technology described in this disclosure provide an optical fingerprint sensor module that uses, at least in part, the light from a display screen as the illumination probe light to illuminate a fingerprint sensing area on the touch sensing surface of the display screen to perform one or more sensing operations based on optical sensing of such light in some implementations, or designated illumination or probe light for optical sensing from one or more designated illumination light sources separate from the display light for optical sensing in other implementations, or background light for optical sensing in certain implementations.

In the disclosed examples for integrating an optical sensing module to a LCD screen based on the disclosed optical sensor technology, the under LCD optical sensor can be used to detect a portion of the light that is used for displaying images in a LCD screen where such a portion of the light for the display screen may be the scattered light, reflected light or some stray light. For example, in some implementations, the image light of the LCD screen based on backlighting may be reflected or scattered back into the LCD display screen as returned light when encountering an object such as a user finger or palm, or a user pointer device like a stylus. Such returned light can be captured for performing one or more optical sensing operations using the disclosed optical sensor technology. Due to the use of the light from LCD screen for optical sensing, an optical fingerprint sensor module based on the disclosed optical sensor technology is specially designed to be integrated to the LCD display screen in a way that maintains the display operations and functions of the LCD display screen without interference while providing optical sensing operations and functions to enhance overall functionality, device integration and user experience of an electronic device or system such as a smart phone, a tablet, or a mobile and/or wearable device.

In addition, in various implementations of the disclosed optical sensing technology, one or more designated probe light sources may be provided to produce additional illumination probe light for the optical sensing operations by the under-LCD screen optical sensing module. In such applications, the light from the backlighting of the LCD screen and the probe light from the one or more designated probe light sources collectively form the illumination light for optical sensing operations.

Regarding the additional optical sensing functions beyond fingerprint detection, the optical sensing may be used to measure other parameters. For example, the disclosed optical sensor technology can measure a pattern of a palm of a person given the large touch area available over the entire LCD display screen (in contrast, some designated fingerprint sensors such as the fingerprint senor in the home button of Apple's iPhone/iPad devices have a rather small and designated off-screen fingerprint sensing area that is highly limited in the sensing area size that may not be suitable for sensing large patterns). For yet another example, the disclosed optical sensor technology can be used not only to use optical sensing to capture and detect a pattern of a finger or palm that is associated with a person, but also to use optical sensing or other sensing mechanisms to detect whether the captured or detected pattern of a fingerprint or palm is from a live person's hand by a "live finger" detection mechanism, which may be based on, for example, the different optical absorption behaviors of the blood at different optical wavelengths, the fact that a live person's finger tends to be moving or stretching due to the person's natural movement or motion (either intended or unintended) or pulsing when the blood flows through the person's body in connection with the heartbeat. In one implementation, the optical fingerprint sensor module can detect a change in the returned light from a finger or palm due to the heartbeat/blood flow change and thus to detect whether there is a live heartbeat in the object presented as a finger or palm. The user authentication can be based on the combination of the both the optical sensing of the fingerprint/palm pattern and the positive determination of the presence of a live person to enhance the access control. For yet another example, the optical fingerprint sensor module may include a sensing function for measuring a glucose level or a degree of oxygen saturation based on optical sensing in the returned light from a finger or palm. As yet another example, as a person touches the LCD display screen, a change in the touching force can be reflected in one or more ways, including fingerprint pattern deforming, a change in the contacting area between the finger and the screen surface, fingerprint ridge widening, or a change in the blood flow dynamics. Those and other changes can be measured by optical sensing based on the disclosed optical sensor technology and can be used to calculate the touch force. This touch force sensing can be used to add more functions to the optical fingerprint sensor module beyond the fingerprint sensing.

With respect to useful operations or control features in connection with the touch sensing aspect of the LCD display screen, the disclosed optical sensor technology can provide triggering functions or additional functions based on one or more sensing results from the optical fingerprint sensor module to perform certain operations in connection with the touch sensing control over the LCD display screen. For example, the optical property of a finger skin (e.g., the index of refraction) tends to be different from other artificial objects. Based on this, the optical fingerprint sensor module may be designed to selectively receive and detect returned light that is caused by a finger in touch with the surface of the LCD display screen while returned light caused by other objects would not be detected by the optical fingerprint sensor module. This object-selective optical detection can be used to provide useful user controls by touch sensing, such as waking up the smartphone or device only by a touch via a person's finger or palm while touches by other objects would not cause the device to wake up for energy efficient operations and to prolong the battery use. This operation can be implemented by a control based on the output of the optical fingerprint sensor module to control the waking up circuitry operation of the LCD display screen which, the LCD pixels are put in a "sleep" mode by being turned off (and the LCD backlighting is also turned off) while one or more illumination light sources (e.g., LEDs) for the under-LCD panel optical fingerprint sensor module are turned on in a flash mode to intermittently emit flash light to the screen surface for sensing any touch by a person's finger or palm. Under this design, the optical fingerprint sensor module operates the one or more illumination light sources to produce the "sleep" mode wake-up sensing light flashes so that the optical fingerprint sensor module can detect returned light of such wake-up sensing light caused by the finger touch on the LCD display screen and, upon a positive detection, the LCD backlighting and the LCD display screen are turned on or "woken up". In some implementations, the wake-up sensing light can be in the infrared invisible spectral range so a user will not experience any visual of a flash light. The LCD display screen operation can be controlled to provide an improved fingerprint sensing by eliminating background light for optical sensing of the fingerprint. In one implementation, for example, each display scan frame generates a frame of fingerprint signals. If, two frames of fingerprint signals with the display are generated in one frame when the LCD display screen is turned on and in the other frame when the LCD display screen is turned off, the subtraction between those two frames of signals can be used to reduce the ambient background light influence. By operating the fingerprint sensing frame rate is at one half of the display frame rate in some implementations, the background light noise in fingerprint sensing can be reduced.

An optical fingerprint sensor module based on the disclosed optical sensor technology can be coupled to the backside of the LCD display screen without requiring creation of a designated area on the surface side of the LCD display screen that would occupy a valuable device surface real estate in some electronic devices such as a smartphone, a tablet or a wearable device. This aspect of the disclosed technology can be used to provide certain advantages or benefits in both device designs and product integration or manufacturing.

In some implementations, an optical fingerprint sensor module based on the disclosed optical sensor technology can be configured as a non-invasive module that can be easily integrated to a display screen without requiring changing the design of the LCD display screen for providing a desired optical sensing function such as fingerprint sensing. In this regard, an optical fingerprint sensor module based on the disclosed optical sensor technology can be independent from the design of a particular LCD display screen design due to the nature of the optical fingerprint sensor module: the optical sensing of such an optical fingerprint sensor module is by detecting the light that is emitted by the one or more illumination light sources of the optical fingerprint sensor module and is returned from the contact surface of the display area, and the disclosed optical fingerprint sensor module is coupled to the backside of the LCD display screen as a under-screen optical fingerprint sensor module for receiving the returned light from the contact surface of the display area and thus does not require a special sensing port or sensing area that is separate from the display screen area. Accordingly, such an under-screen optical fingerprint sensor module can be used to combine with a LCD display screen to provide optical fingerprint sensing and other sensor functions on an LCD display screen without using a specially designed LCD display screen with hardware especially designed for providing such optical sensing. This aspect of the disclosed optical sensor technology enables a wide range of LCD display screens in smartphones, tablets or other electronic devices with enhanced functions from the optical sensing of the disclosed optical sensor technology.

For example, for an existing phone assembly design that does not provide a separate fingerprint sensor as in certain Apple iPhones or Samsung Galaxy smartphones, such an existing phone assembly design can integrate the under-screen optical fingerprint sensor module as disclosed herein without changing the touch sensing-display screen assembly to provide an added on-screen fingerprint sensing function. Because the disclosed optical sensing does not require a separate designated sensing area or port as in the case of certain Apple iPhones/Samsung Galaxy phones with a front fingerprint senor outside the display screen area, or some smartphones with a designated rear fingerprint sensor on the backside like in some models by Huawei, Xiaomi, Google or Lenovo, the integration of the on-screen fingerprint sensing disclosed herein does not require a substantial change to the existing phone assembly design or the touch sensing display module that has both the touch sensing layers and the display layers. Based on the disclosed optical sensing technology in this document, no external sensing port and no external hardware button are needed on the exterior of a device are needed for adding the disclosed optical fingerprint sensor module for fingerprint sensing. The added optical fingerprint sensor module and the related circuitry are under the display screen inside the phone housing and the fingerprint sensing can be conveniently performed on the same touch sensing surface for the touch screen.

For another example, due to the above described nature of the optical fingerprint sensor module for fingerprint sensing, a smartphone that integrates such an optical fingerprint sensor module can be updated with improved designs, functions and integration mechanism without affecting or burdening the design or manufacturing of the LCD display screens to provide desired flexibility to device manufacturing and improvements/upgrades in product cycles while maintaining the availability of newer versions of optical sensing functions to smartphones, tablets or other electronic devices using LCD display screens. Specifically, the touch sensing layers or the LCD display layers may be updated in the next product release without adding any significant hardware change for the fingerprint sensing feature using the disclosed under-screen optical fingerprint sensor module. Also, improved on-screen optical sensing for fingerprint sensing or other optical sensing functions by such an optical fingerprint sensor module can be added to a new product release by using a new version of the under-screen optical fingerprint sensor module without requiring significant changes to the phone assembly designs, including adding additional optical sensing functions.

The above and other features of the disclosed optical sensor technology can be implemented to provide a new generation of electronic devices with improved fingerprint sensing and other sensing functions, especially for smartphones, tablets and other electronic devices with LCD display screens to provide various touch sensing operations and functions and to enhance the user experience in such devices. The features for optical fingerprint sensor modules disclosed herein may be applicable to various display panels based on different technologies including both LCD and OLED displays. The specific examples below are directed to LCD display panels and optical fingerprint sensor modules placed under LCD display panels.

In implementations of the disclosed technical features, additional sensing functions or sensing modules, such as a biomedical sensor, e.g., a heartbeat sensor in wearable devices like wrist band devices or watches, may be provided. In general, different sensors can be provided in electronic devices or systems to achieve different sensing operations and functions.

The disclosed technology can be implemented to provide devices, systems, and techniques that perform optical sensing of human fingerprints and authentication for authenticating an access attempt to a locked computer-controlled device such as a mobile device or a computer-controlled system, that is equipped with a fingerprint detection module. The disclosed technology can be used for securing access to various electronic devices and systems, including portable or mobile computing devices such as laptops, tablets, smartphones, and gaming devices, and other electronic devices or systems such as electronic databases, automobiles, bank ATMs, etc.

II. DESIGN EXAMPLES OF UNDER-DISPLAY OPTICAL SENSING MODULES

As described herein, embodiments provide large-sensing-area implementations of under-display optical sensing modules, such as for under-screen optical fingerprint modules. For the sake of added clarity and context, examples are described of various designs for an under-screen optical fingerprint sensor module for collecting an optical signal to the optical detectors and providing desired optical imaging such as a sufficient imaging resolution. These and other embodiments of under-display optical fingerprint sensing implementations are further described in the following patent documents, which are hereby incorporated by reference in their entirety: U.S. patent application Ser. No. 15/616,856; U.S. patent application Ser. No. 15/421,249; U.S. patent application Ser. No. 16/190,138; U.S. patent application Ser. No. 16/190,141; U.S. patent application Ser. No. 16/246,549; and U.S. patent application Ser. No. 16/427,269.

FIG. 1 is a block diagram of an example of a system 180 with a fingerprint sensing module 180 including a fingerprint sensor 181 which can be implemented to include an optical fingerprint sensor based on the optical sensing of fingerprints as disclosed in this document. The system 180 includes a fingerprint sensor control circuit 184, and a digital processor 186 which may include one or more processors for processing fingerprint patterns and determining whether an input fingerprint pattern is one for an authorized user. The fingerprint sensing system 180 uses the fingerprint sensor 181 to obtain a fingerprint and compares the obtained fingerprint to a stored fingerprint to enable or disable functionality in a device or system 188 that is secured by the fingerprint sensing system 180. In operation, the access to the device 188 is controlled by the fingerprint processing processor 186 based on whether the captured user fingerprint is from an authorized user. As illustrated, the fingerprint sensor 181 may include multiple fingerprint sensing pixels such as pixels 182A-182E that collectively represent at least a portion of a fingerprint. For example, the fingerprint sensing system 180 may be implemented at an ATM as the system 188 to determine the fingerprint of a customer requesting to access funds or other transactions. Based on a comparison of the customer's fingerprint obtained from the fingerprint sensor 181 to one or more stored fingerprints, the fingerprint sensing system 180 may, upon a positive identification, cause the ATM system 188 to grant the requested access to the user account, or, upon a negative identification, may deny the access. For another example, the device or system 188 may be a smartphone or a portable device and the fingerprint sensing system 180 is a module integrated to the device 188. For another example, the device or system 188 may be a gate or secured entrance to a facility or home that uses the fingerprint sensor 181 to grant or deny entrance. For yet another example, the device or system 188 may be an automobile or other vehicle that uses the fingerprint sensor 181 to link to the start of the engine and to identify whether a person is authorized to operate the automobile or vehicle.

Figure 2A:
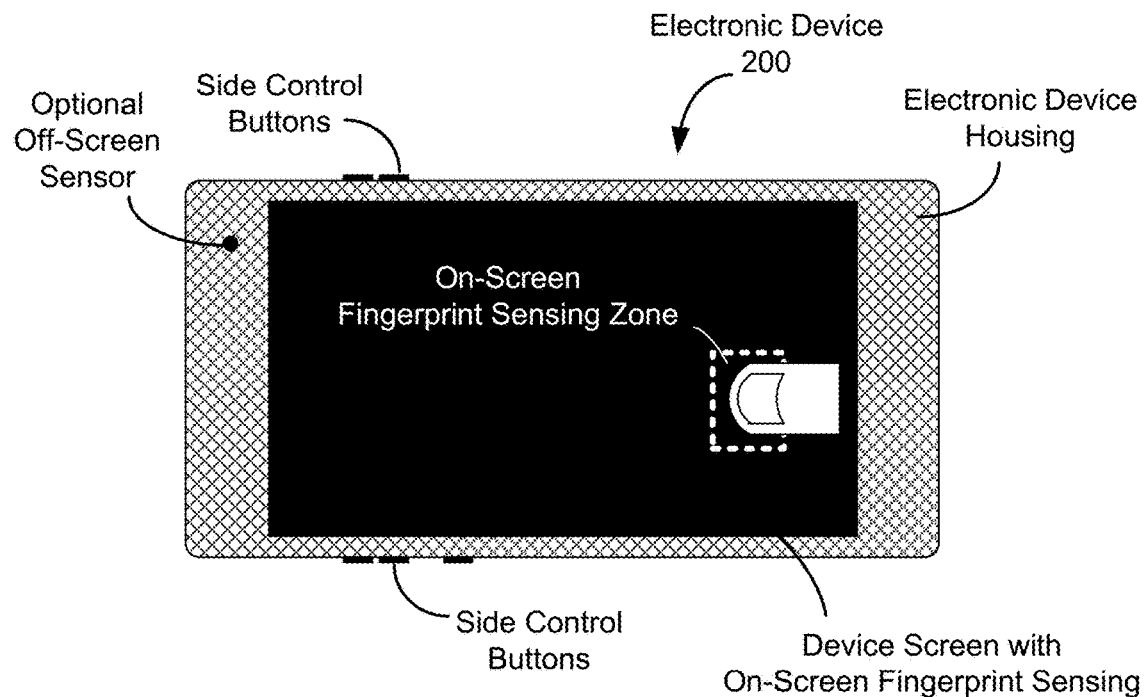
FIGS. 2A and 2B illustrate an exemplary implementation of an electronic device having a touch sensing display screen assembly and an optical fingerprint sensor module positioned underneath the touch sensing display screen assembly according to some embodiments.
Figure 2B:
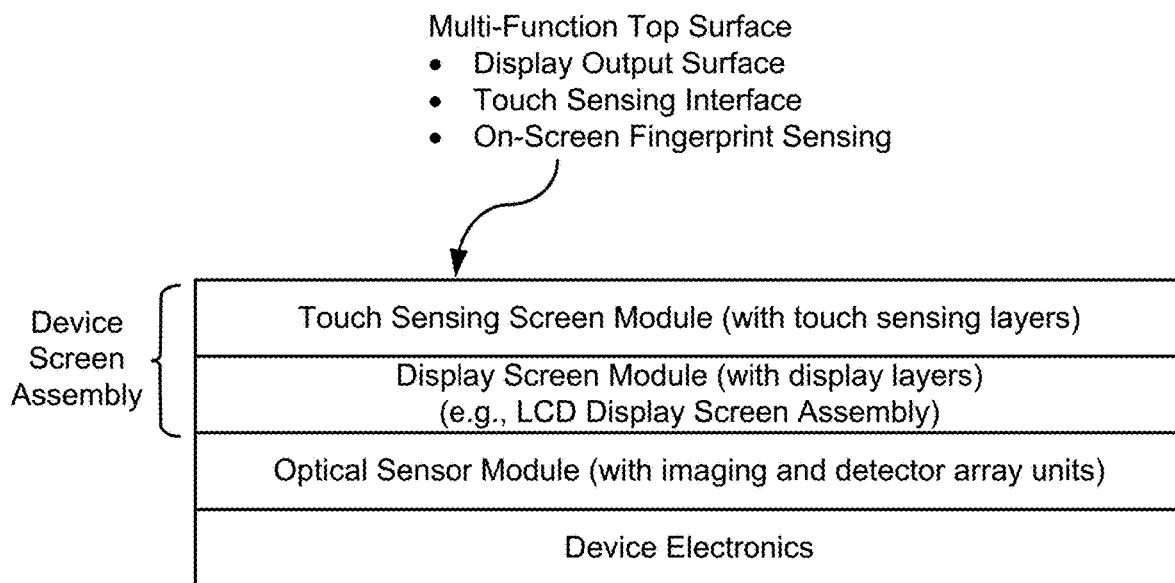

As a specific example, FIGS. 2A and 2B illustrate one exemplary implementation of an electronic device 200 having a touch sensing display screen assembly and an optical fingerprint sensor module positioned underneath the touch sensing display screen assembly. In this particular example, the display technology can be implemented by a LCD display screen with backlight for optically illuminating the LCD pixels or another display screen having light emitting display pixels without using backlight (e.g., an OLED display screen). The electronic device 200 can be a portable device such as a smartphone or a tablet and can be the device 188 as shown in FIG. 1.

FIG. 2A shows the front side of the device 200 which may resemble some features in some existing smartphones or tablets. The device screen is on the front side of the device 200 occupying either entirety, a majority or a significant portion of the front side space and the fingerprint sensing function is provided on the device screen, e.g., one or more sensing areas for receiving a finger on the device screen. As an example, FIG. 2A shows a fingerprint sensing zone in the device screen for a finger to touch which may be illuminated as a visibly identifiable zone or area for a user to place a finger for fingerprint sensing. Such a fingerprint sensing zone can function like the rest of the device screen for displaying images. As illustrated, the device housing of the device 200 may have, in various implementations, side facets that support side control buttons that are common in various smartphones on the market today. Also, one or more optional sensors may be provided on the front side of the device 200 outside the device screen as illustrated by one example on the left upper corner of the device housing in FIG. 2A.

FIG. 2B shows an example of the structural construction of the modules in the device 200 relevant to the optical fingerprint sensing disclosed in this document. The device screen assembly shown in FIG. 2B includes, e.g., the touch sensing screen module with touch sensing layers on the top, and a display screen module with display layers located underneath the touch sensing screen module. An optical fingerprint sensor module is coupled to, and located underneath, the display screen assembly module to receive and capture the returned light from the contact surface of the touch sensing screen module and to guide and image the returned light onto an optical sensor array of optical sensing pixels or photodetectors which convert the optical image in the returned light into pixel signals for further processing. Underneath the optical fingerprint sensor module is the device electronics structure containing certain electronic circuits for the optical fingerprint sensor module and other parts in the device 200. The device electronics may be arranged inside the device housing and may include a part that is under the optical fingerprint sensor module as shown in FIG. 2B.

In implementations, the contact surface of the device screen assembly can be a surface of an optically transparent layer serving as a user touch sensing surface to provide multiple functions, such as (1) a display output surface through which the light carrying the display images passes through to reach a viewer's eyes, (2) a touch sensing interface to receive a user's touches for the touch sensing operations by the touch sensing screen module, and (3) an optical interface for on-screen fingerprint sensing (and possibly one or more other optical sensing functions). This optically transparent layer can be a rigid layer such as a glass or crystal layer or a flexible layer.

One example of a display screen is an LCD display having LCD layers and a thin film transistor (TFT) structure or substrate. A LCD display panel is a multi-layer liquid crystal display (LCD) module that includes LCD display backlighting light sources (e.g., LED lights) emitting LCD illumination light for LCD pixels, a light waveguide layer to guide the backlighting light, and LCD structure layers which can include, e.g., a layer of liquid crystal (LC) cells, LCD electrodes, transparent conductive ITO layer, an optical polarizer layer, a color filter layer, and a touch sensing layer. The LCD module also includes a backlighting diffuser underneath the LCD structure layers and above the light waveguide layer to spatially spread the backlighting light for illuminating the LCD display pixels, and an optical reflector film layer underneath the light waveguide layer to recycle backlighting light towards the LCD structure layers for improved light use efficiency and the display brightness. For optical sensing, one or more separate illumination light sources are provided and are operated independently from the backlighting light sources of the LCD display module.

Referring to FIG. 2B, the optical fingerprint sensor module in this example is placed under the LCD display panel to capture the returned light from the top touch sensing surface and to acquire high resolution images of fingerprint patterns when user's finger is in touch with a sensing area on the contact surface. In other implementations, the disclosed under-screen optical fingerprint sensor module for fingerprint sensing may be implemented on a device without the touch sensing feature.

Figure 3A:
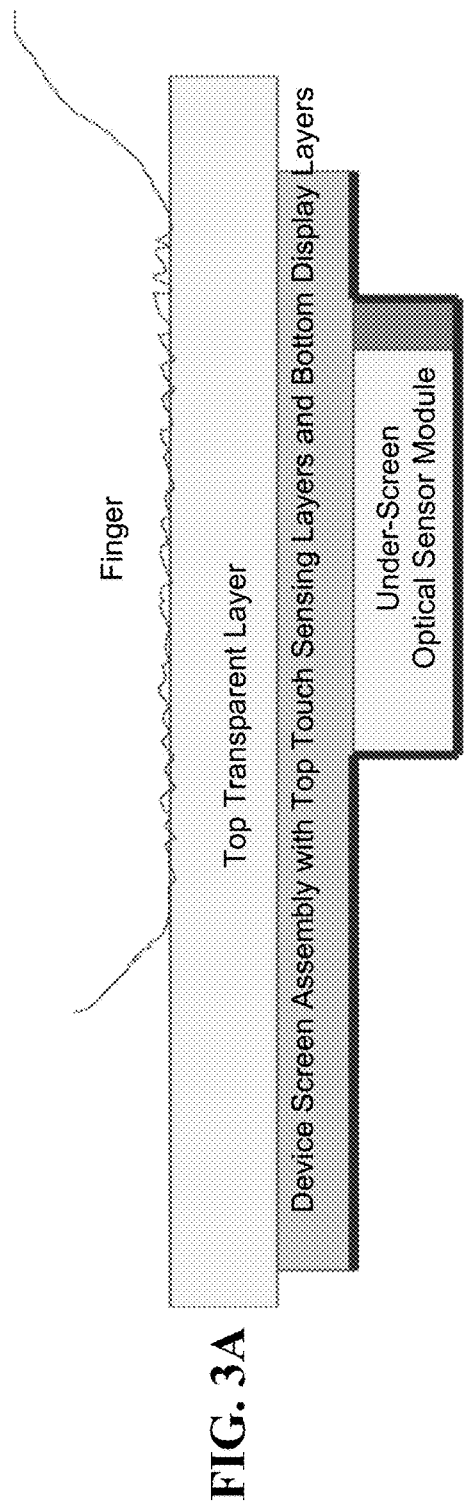
FIGS. 3A and 3B illustrate an example of a device that implements the optical fingerprint sensor module illustrated in FIGS. 2A and 2B according to some embodiments.
Figure 3B:
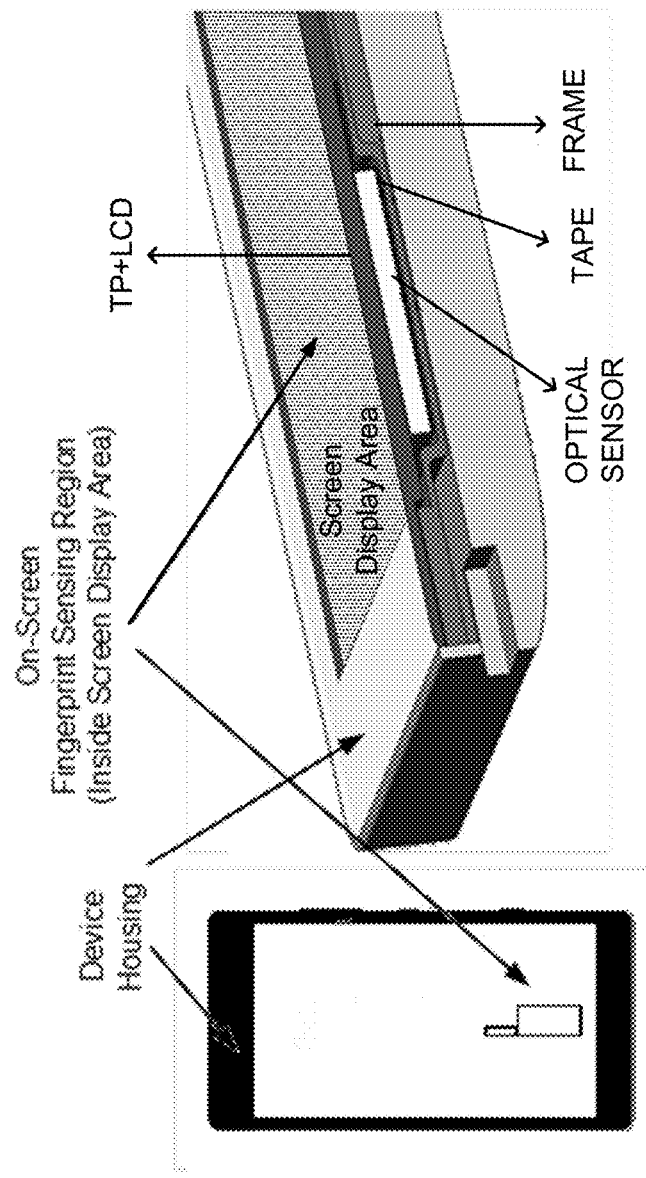

FIGS. 3A and 3B illustrate an example of a device that implements the optical fingerprint sensor module in FIGS. 2A and 2B. FIG. 3A shows a cross sectional view of a portion of the device containing the under-screen optical fingerprint sensor module. FIG. 3B shows, on the left, a view of the front side of the device with the touch sensing display indicating a fingerprint sensing area on the lower part of the display screen, and on the right, a perspective view of a part of the device containing the optical fingerprint sensor module that is under the device display screen assembly. FIG. 3B also shows an example of the layout of the flexible tape with circuit elements.

In the design examples in FIGS. 2A-2B, and 3A-3B, the optical fingerprint sensor design is different from some other fingerprint sensor designs using a separate fingerprint sensor structure from the display screen with a physical demarcation between the display screen and the fingerprint sensor (e.g., a button like structure in an opening of the top glass cover in some mobile phone designs) on the surface of the mobile device. In the illustrated designs here, the optical fingerprint sensor for detecting fingerprint sensing and other optical signals are located under the top cover glass or layer (e.g., FIG. 3A) so that the contact surface of the cover glass serves as the contact surface of the mobile device as a contiguous and uniform glass surface across both the display screen layers and the optical detector sensor that are vertically stacked and vertically overlap. This design example for integrating optical fingerprint sensing and the touch sensitive display screen under a common and uniform surface provides benefits, including improved device integration, enhanced device packaging, enhanced device resistance to exterior elements, failure and wear and tear, and enhanced user experience over the ownership period of the device.

Referring back to FIGS. 2A and 2B, the illustrated under-screen optical fingerprint sensor module for on-screen fingerprint sensing may be implemented in various configurations. In one implementation, a device based on the above design can be structured to include a device screen a that provides touch sensing operations and includes a LCD display panel structure for forming a display image, a top transparent layer formed over the device screen as an interface for being touched by a user for the touch sensing operations and for transmitting the light from the display structure to display images to a user, and an optical fingerprint sensor module located below the display panel structure to receive light that returns from the top transparent layer to detect a fingerprint.

This device and other devices disclosed herein can be further configured to include various features. For example, a device electronic control module can be included in the device to grant a user's access to the device if a detected fingerprint matches a fingerprint an authorized user. In addition, the optical fingerprint sensor module is configured to, in addition to detecting fingerprints, also detect a biometric parameter different form a fingerprint by optical sensing to indicate whether a touch at the top transparent layer associated with a detected fingerprint is from a live person, and the device electronic control module is configured to grant a user's access to the device if both (1) a detected fingerprint matches a fingerprint an authorized user and (2) the detected biometric parameter indicates the detected fingerprint is from a live person. The biometric parameter can include, e.g., whether the finger contains a blood flow, or a heartbeat of a person.

For example, the device can include a device electronic control module coupled to the display panel structure to supply power to the light emitting display pixels and to control image display by the display panel structure, and, in a fingerprint sensing operation, the device electronic control module operates to turn off the light emitting display pixels in one frame to and turn on the light emitting display pixels in a next frame to allow the optical sensor array to capture two fingerprint images with and without the illumination by the light emitting display pixels to reduce background light in fingerprint sensing.

For another example, a device electronic control module may be coupled to the display panel structure to supply power to the LCD display panel and to turn off power to the backlighting of the LCD display panel in a sleep mode, and the device electronic control module may be configured to wake up the display panel structure from the sleep mode when the optical fingerprint sensor module detects the presence of a person's skin at the designated fingerprint sensing region of the top transparent layer. More specifically, in some implementations, the device electronic control module can be configured to operate one or more illumination light sources in the optical fingerprint sensor module to intermittently emit light, while turning off power to the LCD display panel (in the sleep mode), to direct the intermittently emitted illumination light to the designated fingerprint sensing region of the top transparent layer for monitoring whether there is a person's skin in contact with the designated fingerprint sensing region for waking up the device from the sleep mode.

For another example, the device can include a device electronic control module coupled to the optical fingerprint sensor module to receive information on multiple detected fingerprints obtained from sensing a touch of a finger and the device electronic control module is operated to measure a change in the multiple detected fingerprints and determines a touch force that causes the measured change. For instance, the change may include a change in the fingerprint image due to the touch force, a change in the touch area due to the touch force, or a change in spacing of fingerprint ridges.

For another example, the top transparent layer can include a designated fingerprint sensing region for a user to touch with a finger for fingerprint sensing and the optical fingerprint sensor module below the display panel structure can include a transparent block in contact with the display panel substrate to receive light that is emitted from the display panel structure and returned from the top transparent layer, an optical sensor array that receives the light and an optical imaging module that images the received light in the transparent block onto the optical sensor array. The optical fingerprint sensor module can be positioned relative to the designated fingerprint sensing region and structured to selectively receive returned light via total internal reflection at the contact surface of the top transparent layer when in contact with a person's skin while not receiving the returned light from the designated fingerprint sensing region in absence of a contact by a person's skin.

For yet another example, the optical fingerprint sensor module can be structured to include an optical wedge located below the display panel structure to modify a total reflection condition on a bottom surface of the display panel structure that interfaces with the optical wedge to permit extraction of light out of the display panel structure through the bottom surface, an optical sensor array that receives the light from the optical wedge extracted from the display panel structure, and an optical imaging module located between the optical wedge and the optical sensor array to image the light from the optical wedge onto the optical sensor array.

Figure 4A:
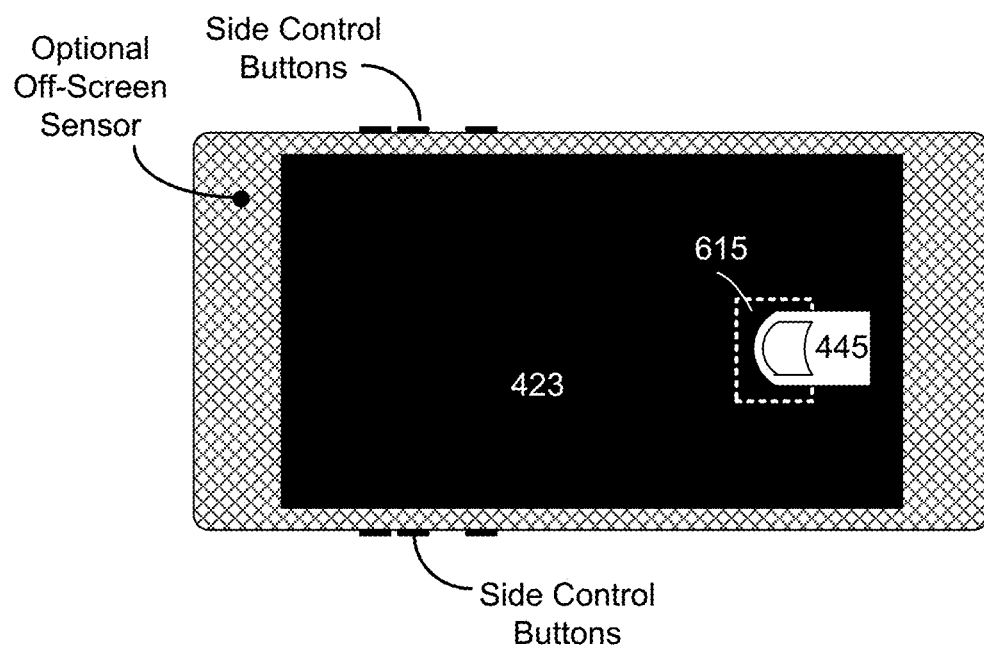
FIGS. 4A and 4B show an exemplary implementation of an optical fingerprint sensor module under the display screen assembly for implementing the design illustrated in FIGS. 2A and 2B according to some embodiments.
Figure 4B:
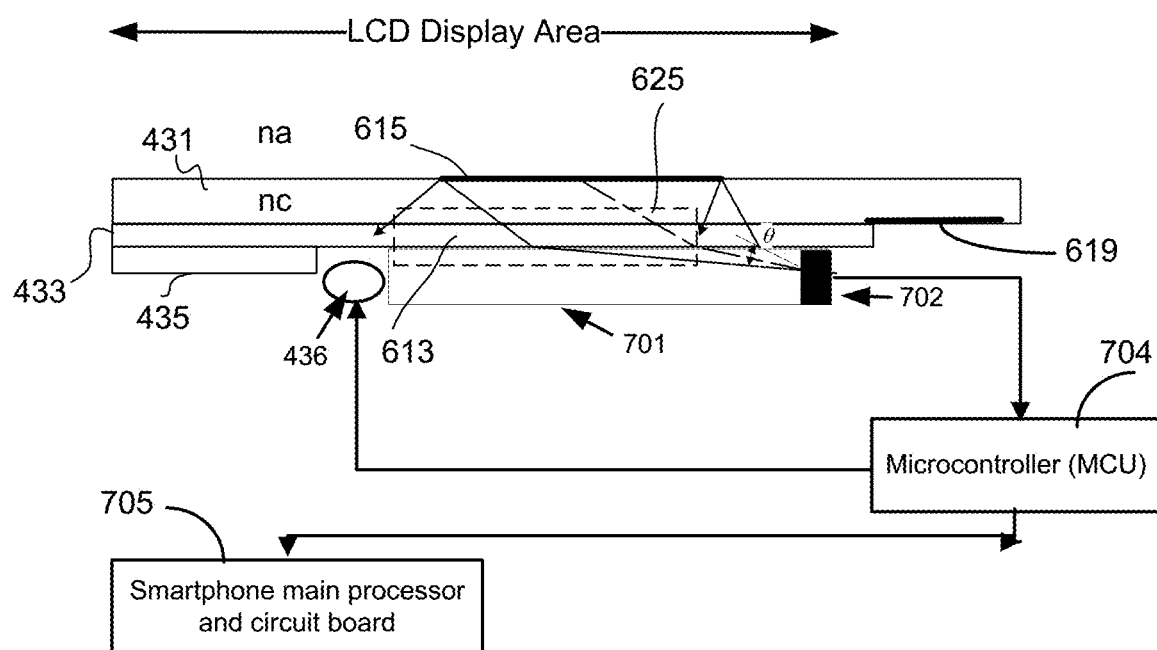

FIGS. 4A and 4B show an example of one implementation of an optical fingerprint sensor module under the display screen assembly for implementing the design in FIGS. 2A and 2B. The device illustrated in FIGS. 4A and 4B includes a display assembly 423 with a top transparent layer 431 formed over the device screen assembly 423 as an interface for being touched by a user for the touch sensing operations and for transmitting the light from the display structure to display images to a user. This top transparent layer 431 can be a cover glass or a crystal material in some implementations. The device screen assembly 423 can include a LCD display module 433 under the top transparent layer 431. The LCD display layers allow partial optical transmission so light from the contact surface can partially transmit through the LCD display layers to reach the under-LCD optical fingerprint sensor module. For example, LCD display layers include electrodes and wiring structure optically acting as an array of holes and light scattering objects. A device circuit module 435 may be provided under the LCD display panel to control operations of the device and perform functions for the user to operate the device.

The optical fingerprint sensor module 702 in this particular implementation example is placed under LCD display module 433. One or more illumination light sources, e.g., an illumination light source 436 under the LCD display module 433 or/and another one or more illumination light sources located under the top cover glass 431, are provided for providing the illumination light or probe light for the optical sensing by the optical fingerprint sensor module 702 and can be controlled to emit light to at least partially pass through the LCD display module 433 to illuminate the fingerprint sensing zone 615 on the top transparent layer 431 within the device screen area for a user to place a finger therein for fingerprint identification. The illumination light from the one or more illumination light sources 436 can be directed to the fingerprint sensing area 615 on the contact surface as if such illumination light is from a fingerprint illumination light zone 613. Another one or more illumination light sources may be located under the top cover glass 431 and may be placed adjacent to the fingerprint sensing area 615 on the contact surface to direct produced illumination light to reach the top cover glass 433 without passing through the LCD display module 433. In some designs, one or more illumination light sources may be located above the bottom surface of the top cover glass 431 to direct produced illumination light to reach the fingerprint sensing region above the contact surface of the top cover glass 433 without necessarily passing through the top cover glass 431, e.g., directing illuminating the finger above the top cover glass 431.

As illustrated in FIG. 4A, a finger 445 is placed in the illuminated fingerprint sensing zone 615 as the effective sensing zone for fingerprint sensing. A portion of the reflected or scattered light in the zone 615 is directed into the optical fingerprint sensor module underneath the LCD display module 433 and a photodetector sensing array inside the optical fingerprint sensor module receives such light and captures the fingerprint pattern information carried by the received light. The one or more illumination light sources 436 are separate from the backlighting sources for the LCD display module and are operated independently from the backlighting light sources of the LCD display module.

In this design of using one or more illumination light sources 436 to provide the illumination light for optical fingerprint sensing, each illumination light source 436 maybe controlled in some implementations to turn on intermittently with a relatively low cycle to reduce the power used for the optical sensing operations. The fingerprint sensing operation can be implemented in a two-step process in some implementations: first, the one or more illumination light sources 436 are turned on in a flashing mode without turning on the LCD display panel to use the flashing light to sense whether a finger touches the sensing zone 615 and, once a touch in the zone 615 is detected, the optical sensing module is operated to perform the fingerprint sensing based on optical sensing and the LCD display panel may be turned on.

In the example in FIG. 4B, the under-screen optical fingerprint sensor module includes a transparent block 701 that is coupled to the display panel to receive the returned light from the contact surface of the device assembly, and an optical imaging block 702 that performs the optical imaging and imaging capturing. Light from the one or more illumination light sources 436, after reaching the cover contact surface, e.g., the cover contact surface at the sensing area 615 where a user finger touches or is located without touching the cover contact surface, is reflected or scattered back from the cover contact surface in a design in which the illumination light source 436 is located to direct the illumination light to first transmit through the top cover glass 431 to reach the finger. When fingerprint ridges in contact of the cover contact surface in the sensing area 615, the light reflection under the fingerprint ridges is different, due to the presence of the skin or tissue of the finger in contact at that location, from the light reflection at another location under the fingerprint valley, where the skin or tissue of the finger is absent. This difference in light reflection conditions at the locations of the ridges and valleys in the touched finger area on the cover contact surface forms an image representing an image or spatial distribution of the ridges and valleys of the touched section of the finger. The reflection light is directed back towards the LCD display module 433, and, after passing through the small holes of the LCD display module 433, reaches the interface with the low index optically transparent block 701 of the optical fingerprint sensor module. The low index optically transparent block 701 is constructed to have a refractive index less than a refractive index of the LCD display panel so that the returned light can be extracted out of the LCD display panel into the optically transparent block 701. Once the returned light is received inside the optically transparent block 701, such received light enters the optical imaging unit as part of the imaging sensing block 702 and is imaged onto the photodetector sensing array or optical sensing array inside the block 702. The light reflection differences between fingerprint ridges and valleys create the contrast of the fingerprint image. As shown in FIG. 4B, a control circuit 704 (e.g., a microcontroller or MCU) is coupled to the imaging sensing block 702 and to other circuitry such as the device main processor 705 on a main circuit board.

In this particular example, the optical light path design is structured so that the illumination light enters the cover contact surface within the total reflection angles on the contact surface between the substrate and air interface and, therefore, the reflected light is collected most effectively by the imaging optics and imaging sensor array in the block 702. In this design, the image of the fingerprint ridge/valley area exhibits a maximum contrast due to the total internal reflection condition at each finger valley location where the finger tissue does not touch the top contact surface of the top cover glass 431. Some implementations of such an imaging system may have undesired optical distortions that would adversely affect the fingerprint sensing. Accordingly, the acquired image may be further corrected by a distortion correction during the imaging reconstruction in processing the output signals of the optical sensor array in the block 702 based on the optical distortion profile along the light paths of the returned light at the optical sensor array. The distortion correction coefficients can be generated by images captured at each photodetector pixel by scanning a test image pattern one line pixel at a time, through the whole sensing area in both X direction lines and Y direction lines. This correction process can also use images from tuning each individual pixel on one at a time, and scanning through the whole image area of the photodetector array. This correction coefficients only need to be generated one time after assembly of the sensor.

The background light from environment (e.g., sunlight or room illumination light) may enter the image sensor through the LCD panel contact surface, and through holes in the LCD display assembly 433. Such background light can create a background baseline in the interested images from a finger and thus may undesirably degrade the contrast of a captured image. Different methods can be used to reduce this undesired baseline intensity caused by the background light. One example is to tune on and off the illumination light source 436 at a certain illumination modulation frequency f and the image sensor accordingly acquires the received images at the same illumination modulation frequency by phase synchronizing the light source driving pulse and image sensor frame. Under this operation, only one of the image phases contain light from the light source. In implementing this technique, the imaging capturing can be timed to capture images with the illumination light on at even (or odd) frames while turning off the illumination light at odd (or even) frames and, accordingly, subtracting even and odd frames can be used to obtain an image which is mostly formed by light emitted from the modulated illumination light source with significantly reduced background light. Based on this design, each display scan frame generates a frame of fingerprint signals and two sequential frames of signals are obtained by turning on the illumination light in one frame and off in the other frame. The subtraction of adjacent frames can be used to minimize or substantially reduce the ambient background light influence. In implementations, the fingerprint sensing frame rate can be one half of the display frame rate.

In the example shown in FIG. 4B, a portion of the light from the one or more illumination light sources 436 may also go through the cover contact surface and enter the finger tissues. This part of the illumination light is scattered around and a part of this scattered light may be eventually collected by the imaging sensor array in the optical fingerprint sensor module 702. The light intensity of this scattered light is a result of interacting with the inner tissues of the finger and thus depends on the finger's skin color, the blood concentration in the finger tissue or the inner finger tissues. Such information of the finger is carried by this scattered light on the finger, is useful for fingerprint sensing, and can be detected as part of the fingerprint sensing operation. For example, the intensity of a region of user's finger image can be integrated in detection for measuring or observing in increase or decrease in the blood concentration that is associated with or depends on the phase of the user's heart-beat. This signature can be used to determine the user's heart beat rate, to determine if the user's finger is a live finger, or to provide a spoof device with a fabricated fingerprint pattern. Additional examples of using information in light carrying information on the inner tissues of a finger are provided in later sections of this patent document.

The one or more illumination light sources 436 in FIG. 4B can be designed to emit illumination light of different colors or wavelengths in some designs and the optical fingerprint sensor module can capture returned light from a person's finger at the different colors or wavelengths. By recording the corresponding measured intensity of the returned light at the different colors or wavelengths, information associated with the user's skin color, the blood flow or inner tissue structures inside the finger can be measured or determined. As an example, when a user registers a finger for fingerprint authentication operation, the optical fingerprint sensor can be operated to measure the intensity of the scatter light from the finger at two different colors or illumination light wavelengths associated with light color A and light color B, as intensities Ia and Ib, respectively. The ratio of Ia/Ib could be recorded to compare with later measurement when the user's finger is placed on the sensing area on the top sensing surface to measure the fingerprint. This method can be used as part of the device's anti spoofing system to reject a spoof device that is fabricated with a fingerprint emulating or being identical to a user's fingerprint but may not match user's skin color or other biological information of the user.

The one or more illumination light sources 436 can be controlled by the same electronics 704 (e.g., MCU) for controlling the image sensor array in the block 702. The one or more illumination light sources 436 can be pulsed for a short time (e.g., at a low duty cycle) to emit light intermittently and to provide pulse light for image sensing. The image sensor array can be operated to monitor the light pattern at the same pulse duty cycle. If there is a human finger touching the sensing area 615 on the screen, the image that is captured at the imaging sensing array in the block 702 can be used to detect the touching event. The control electronics or MCU 704 connected to the image sensor array in the block 702 can be operated to determine if the touch is by a human finger touch. If it is confirmed that it is a human finger touch event, the MCU 704 can be operated to wake up the smartphone system, turn on the one or more illumination light sources 436 for performing the optical fingerprint sensing), and use the normal mode to acquire a full fingerprint image. The image sensor array in the block 702 sends the acquired fingerprint image to the smartphone main processor 705 which can be operated to match the captured fingerprint image to the registered fingerprint database. If there is a match, the smartphone unlocks the phone to allow a user to access the phone and start the normal operation. If the captured image is not matched, the smartphone produces a feedback to user that the authentication is failed and maintains the locking status of the phone. The user may try to go through the fingerprint sensing again, or may input a passcode as an alternative way to unlock the phone.

In the example illustrated in FIGS. 4A and 4B, the under-screen optical fingerprint sensor module uses the optically transparent block 701 and the imaging sensing block 702 with the photodetector sensing array to optically image the fingerprint pattern of a touching finger in contact with the contact surface of the display screen onto the photodetector sensing array. The optical imaging axis or detection axis 625 from the sensing zone 615 to the photodetector array in the block 702 is illustrated in FIG. 4B for the illustrated example. The optically transparent block 701 and the front end of the imaging sensing block 702 before the photodetector sensing array forma a bulk imaging module to achieve proper imaging for the optical fingerprint sensing. Due to the optical distortions in this imaging process, a distortion correction can be used to achieve the desired imaging operation.

In the optical sensing by the under-screen optical fingerprint sensor module in FIGS. 4A and 4B and other designs disclosed herein, the optical signal from the sensing zone 615 on the top transparent layer 431 to the under-screen optical fingerprint sensor module include different light components.

Figure 5A:
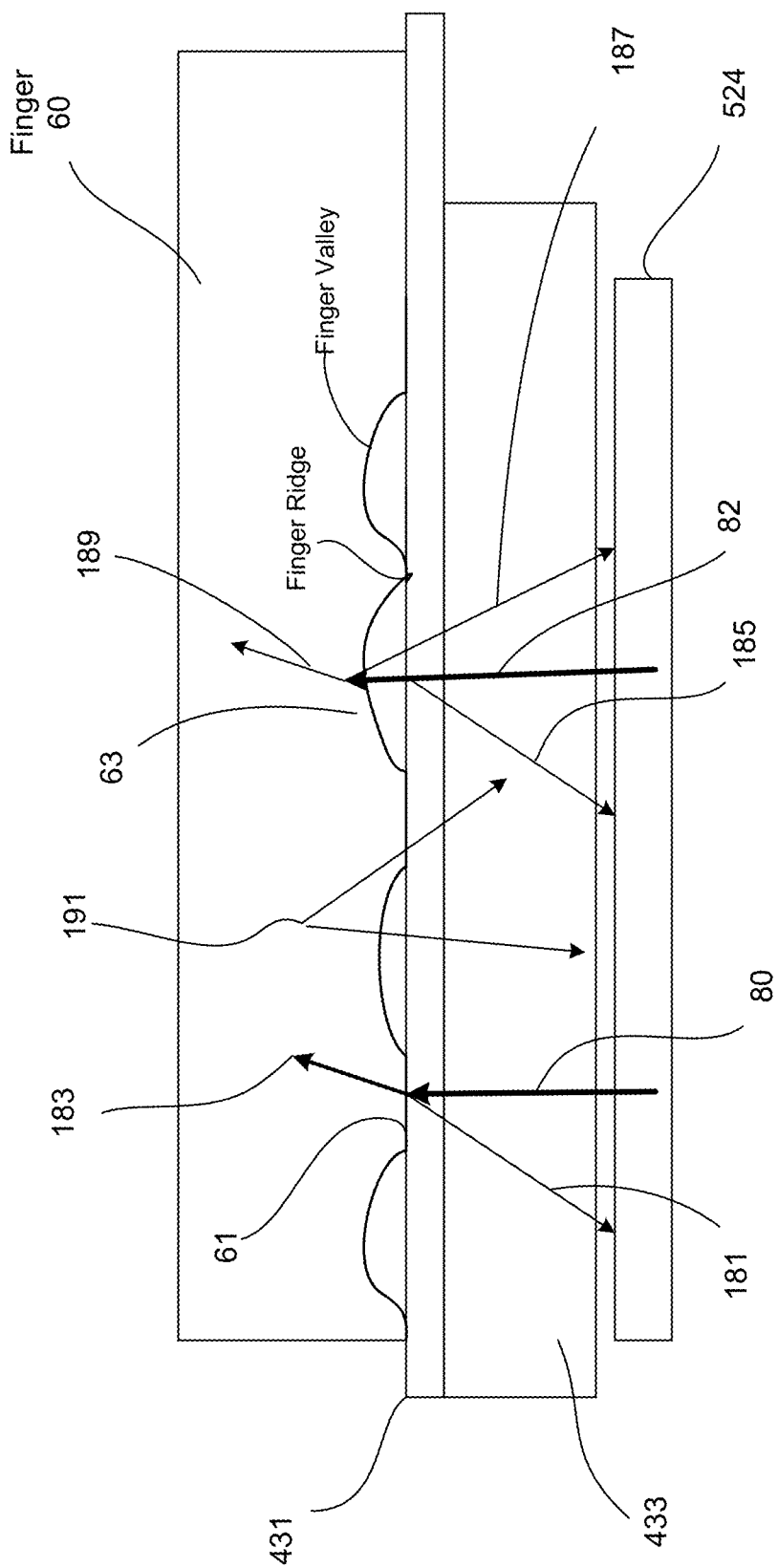
FIGS. 5A-5C illustrate signal generation for the returned light from the sensing zone on the top sensing surface under two different optical conditions to facilitate the understanding of the operation of an under-screen optical fingerprint sensor module according to some embodiments.
Figure 5B:
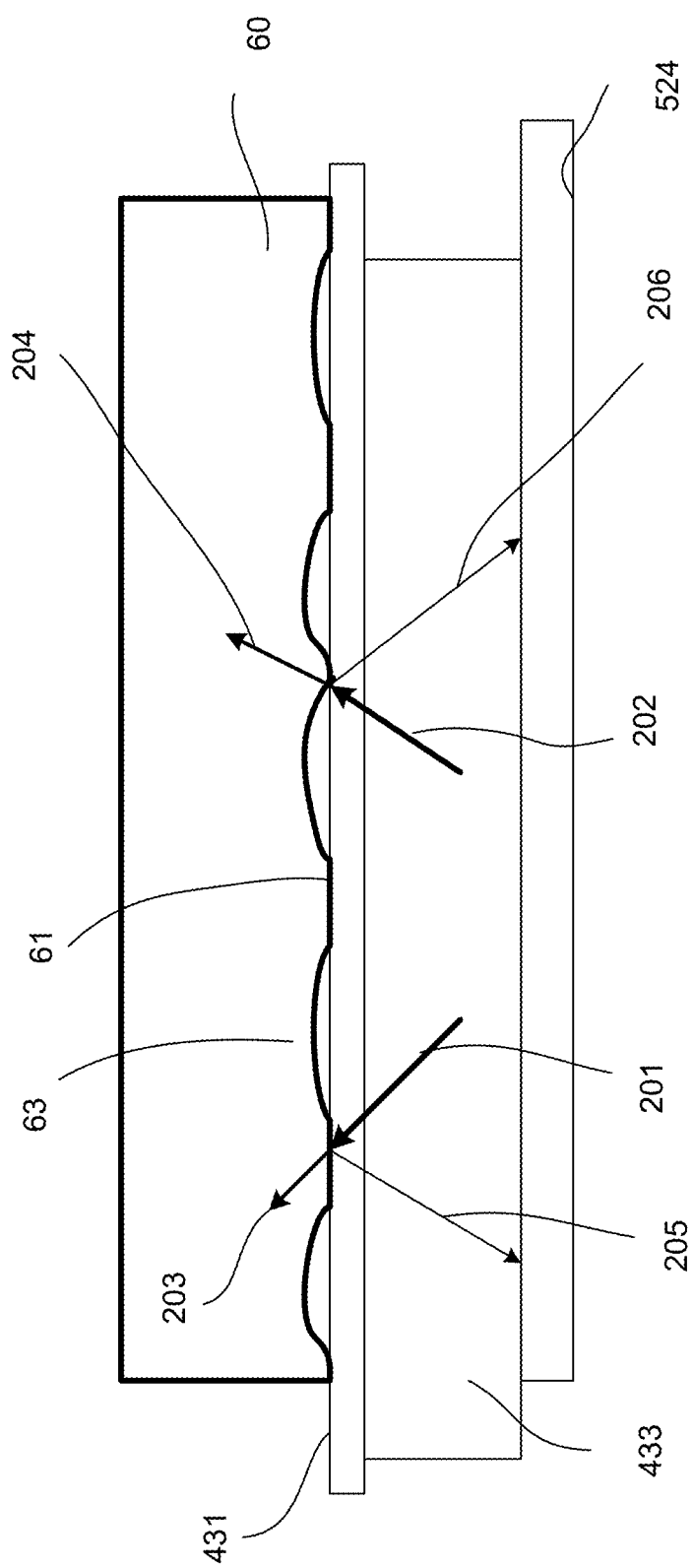
Figure 5C:
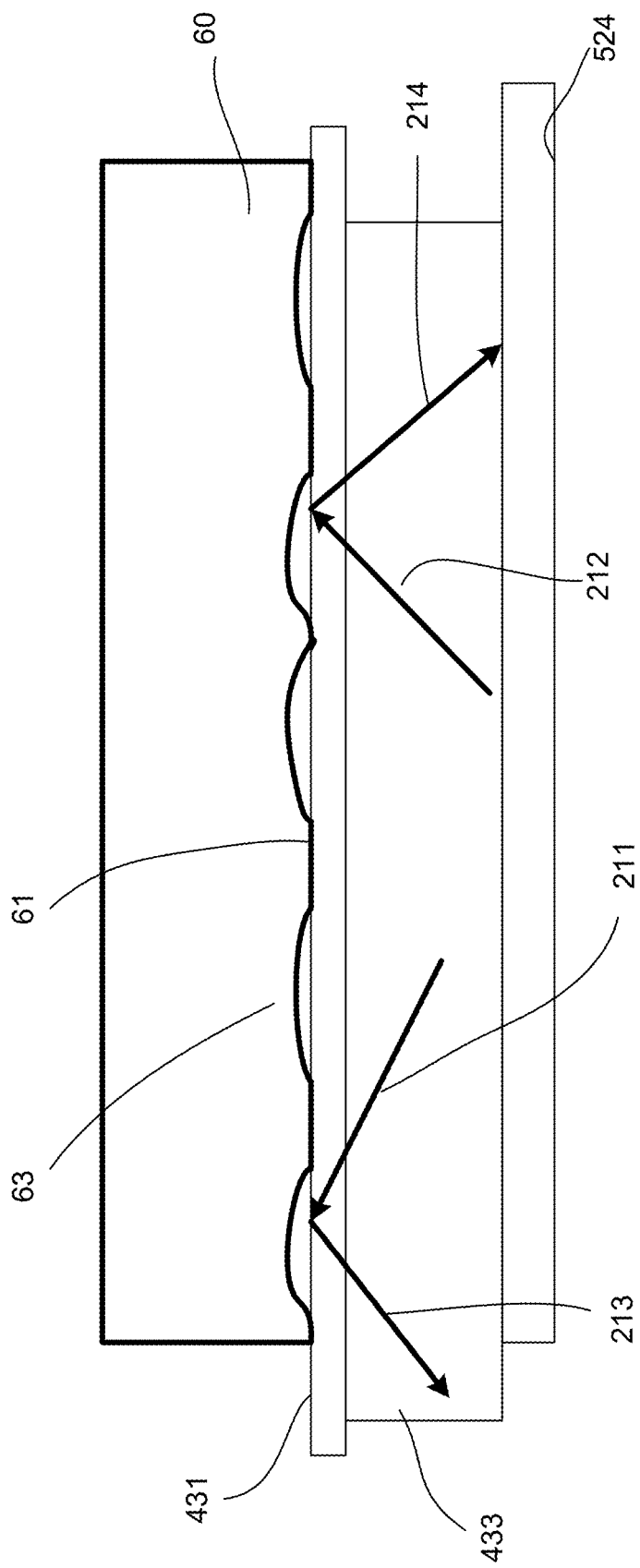

FIGS. 5A-5C illustrate signal generation for the returned light from the sensing zone 615 under different optical conditions to facilitate the understanding of the operation of the under-screen optical fingerprint sensor module. The light that enters into the finger, either from the illumination light source or from other light sources (e.g., background light) can generate internally scattered light in tissues below the finger surface, such as the scattered light 191 in FIGS. 5A-5C. Such internally scattered light in tissues below the finger surface can propagate through the internal tissues of the finger and subsequently transmits through the finger skin to enter the top transparent layer 431 carrying certain information is not carried by light that is scattered, refracted or reflected by the finger surface, e.g., information on finger skin color, the blood concentration or flow characteristics inside the finger, or an optical transmissive pattern of the finger that contains both (1) a two-dimensional spatial pattern of external ridges and valleys of a fingerprint (2) an internal fingerprint pattern associated with internal finger tissue structures that give rise to the external ridges and valleys of a finger.

FIG. 5A shows an example of how illumination light from the one or more illumination light sources 436 propagates through the OLED display module 433, after transmitting through the top transparent layer 431, and generates different returned light signals including light signals that carry fingerprint pattern information to the under-screen optical fingerprint sensor module. For simplicity, two illumination rays 80 and 82 at two different locations are directed to the top transparent layer 431 without experiencing total reflection at the interfaces of the top transparent layer 431. Specifically, the illumination light rays 80 and 82 are perpendicular or nearly perpendicular to the top layer 431. A finger 60 is in contact with the sensing zone 615 on the e top transparent layer 431. As illustrated, the illumination light beam 80 reaches to a finger ridge in contact with the top transparent layer 431 after transmitting through the top transparent layer 431 to generate the light beam 183 in the finger tissue and another light beam 181 back towards the LCD display module 433. The illumination light beam 82 reaches to a finger valley located above the top transparent layer 431 after transmitting through the top transparent layer 431 to generate the reflected light beam 185 from the interface with the top transparent layer 431 back towards the LCD display module 433, a second light beam 189 that enters the finger tissue and a third light beam 187 reflected by the finger valley.

In the example in FIG. 5A, it is assumed that the finger skin's equivalent index of refraction is about 1.44 at 550 nm and the cover glass index of refraction is about 1.51 for the top transparent layer 431. The finger ridge-cover glass interface reflects part of the beam 80 as reflected light 181 to bottom layers 524 below the LCD display module 433. The reflectance can be low, e.g., about 0.1% in some LCD panels. The majority of the light beam 80 becomes the beam 183 that transmits into the finger tissue 60 which causes scattering of the light 183 to produce the returned scattered light 191 towards the LCD display module 433 and the bottom layers 524. The scattering of the transmitted light beam 189 from the LCD pixel 73 in the finger tissue also contributes to the returned scattered light 191.

The beam 82 at the finger skin valley location 63 is reflected by the cover glass surface. In some designs, for example, the reflection may be about 3.5% as the reflected light 185 towards bottom layers 524, and the finger valley surface may reflect about 3.3% of the incident light power (light 187) to bottom layers 524 so that the total reflection may be about 6.8%. The majority light 189 is transmitted into the finger tissues 60. Part of the light power in the transmitted light 189 in the figure tissue is scattered by the tissue to contribute to the scattered light 191 towards and into the bottom layers 524.

Therefore, in the example in FIG. 5A, the light reflections from various interface or surfaces at finger valleys and finger ridges of a touching finger are different and the reflection ratio difference carries the fingerprint map information and can be measured to extract the fingerprint pattern of the portion that is in contact with the top transparent layer 431 and is illuminated the OLED light.

FIGS. 5B and 5C illustrate optical paths of two additional types of illumination light rays at the contact surface under different conditions and at different positions relative to valleys or ridges of a finger, including under a total reflection condition at the interface with the top transparent layer 431. The illustrated illumination light rays generate different returned light signals including light signals that carry fingerprint pattern information to the under-screen optical fingerprint sensor module. It is assumed that the cover glass 431 and the LCD display module 433 are glued together without any air gap in between so that illumination light with a large incident angle to the cover glass 431 will be totally reflected at the cover glass-air interface. FIGS. 5A, 5B and 5C illustrate examples of three different groups divergent light beams: (1) central beams 82 with small incident angles to the cover glass 431 without the total reflection (FIG. 5A), (2) high contrast beams 201, 202, 211, 212 that are totally reflected at the cover glass 431 when nothing touches the cover glass surface and can be coupled into finger tissues when a finger touches the cover glass 431 (FIGS. 5B and 5C), and (3) escaping beams having very large incident angles that are totally reflected at the cover glass 431 even at a location where the finger issue is in contact.

For the central light beams 82, the cover glass surface in some designs may reflect about 0.1%~3.5% to light beam 185 that is transmitted into bottom layers 524, the finger skin may reflect about 0.1%~3.3% to light beam 187 that is also transmitted into bottom layers 524. The reflection difference is dependent on whether the light beams 82 meet with finger skin ridge 61 or valley 63. The rest light beam 189 is coupled into the finger tissues 60.

For high contrast light beams 201 and 202 meeting the local totally internal reflection condition, the cover glass surface reflects nearly 100% to light beams 205 and 206 respectively if nothing touches the cover glass surface. When the finger skin ridges touch the cover glass surface and at light beams 201 and 202 positions, most of the light power may be coupled into the finger tissues 60 by light beams 203 and 204.

For high contrast light beams 211 and 212 meeting the local totally internal reflection condition, the cover glass surface reflects nearly 100% to light beams 213 and 214 respectively if nothing touches the cover glass surface. When the finger touches the cover glass surface and the finger skin valleys happen to be at light beams 211 and 212 positions, no light power is coupled into finger tissues 60.

As illustrated in FIG. 5A, a portion of the illumination light that is coupled into finger tissues 60 tends to experience random scattering by the inner finger tissues to form low-contrast light 191 and part of such low-contrast light 191 can pass through the LCD display module 433 to reach to the optical fingerprint sensor module. This portion of light captured by optical fingerprint sensor module contains additional information on the finger skin color, blood characteristics and the finger inner tissue structures associated with the fingerprint. Additional features for using internally scattered light in tissues below the finger surface in optical sensing will be explained in later part of this patent document, such as obtaining an optical transmissive pattern of the finger that contains both (1) a two-dimensional spatial pattern of external ridges and valleys of a fingerprint (2) an internal fingerprint pattern associated with internal finger tissue structures that give rise to the external ridges and valleys of a finger. Therefore, in high contrast light beams illuminated area, finger skin ridges and valleys cause different optical reflections and the reflection difference pattern carries the fingerprint pattern information. The high contrast fingerprint signals can be achieved by comparing the difference.

The disclosed under-screen optical sensing technology can be in various configurations to optically capture fingerprints based on the design illustrated in FIGS. 2A and 2B. For example, the specific implementation in FIG. 4B based on optical imaging by using a bulk imaging module in the optical sensing module can be implemented in various configurations.

Figure 6A:
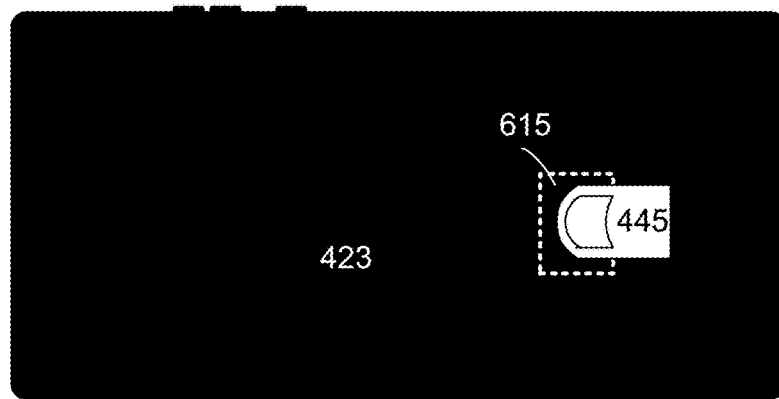
FIGS. 6A-6C, 7, 8A-8B, 9, and 10A-10B illustrate example designs of under-screen optical fingerprint sensor modules according to some embodiments.
Figure 6B:
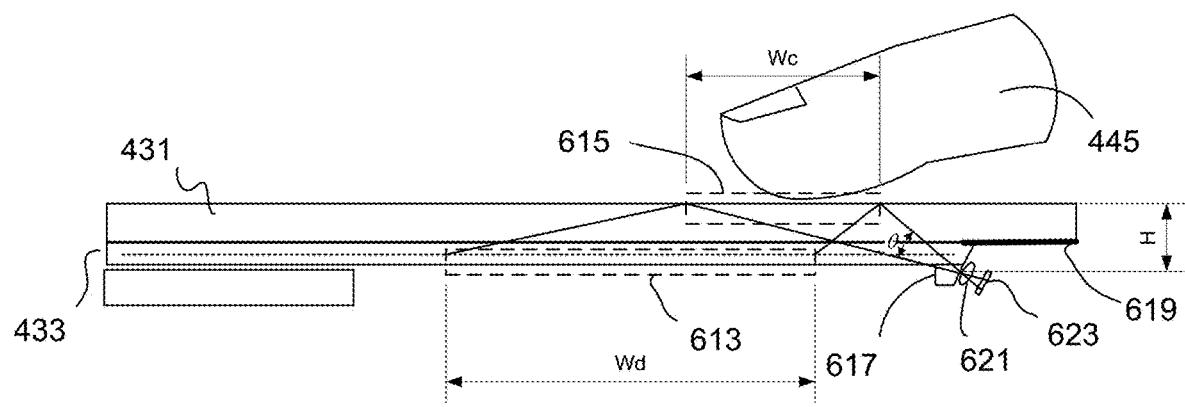
Figure 6C:
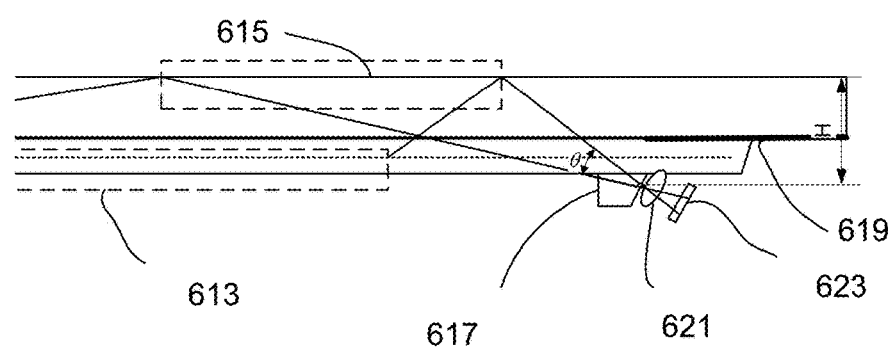

FIGS. 6A-6C show an example of an under-screen optical fingerprint sensor module based on optical imaging via a lens for capturing a fingerprint from a finger 445 pressing on the display cover glass 423. FIG. 6C is an enlarged view of the optical fingerprint sensor module part shown in FIG. 6B. The under-screen optical fingerprint sensor module as shown in FIG. 6B is placed under the LCD display module 433 includes an optically transparent spacer 617 that is engaged to the bottom surface of the LCD display module 433 to receive the returned light from the sensing zone 615 on the contact surface of the top transparent layer 431, an imaging lens 621 that is located between and spacer 617 and the photodetector array 623 to image the received returned light from the sensing zone 615 onto the photodetector array 623. Different from FIG. 4B showing an example of an optical projection imaging system without a lens, the example of the imaging design in FIG. 6B used the imaging lens 621 to capture the fingerprint image at the photodetector array 623 and enables an image reduction by the design of the imaging lens 621. Similar to the imaging system in the example in FIG. 4B to some extent, this imaging system in FIG. 6B for the optical fingerprint sensor module can experience image distortions and a suitable optical correction calibration can be used to reduce such distortions, e.g., the distortion correction methods described for the system in FIG. 4B.

Similar to the assumptions in FIGS. 5A-5C, it is assumed that the finger skin's equivalent index of refraction to be about 1.44 at 550 nm and a bare cover glass index of refraction to be about 1.51 for the cover glass 423. When the OLED display module 433 is glued onto the cover glass 431 without any air gap, the total inner reflection happens in large angles at or larger than the critical incident angle for the interface. The total reflection incident angle is about 41.8° if nothing is in contact with the cover glass contact surface, and the total reflection angle is about 73.7° if the finger skin touches the cover glass contact surface. The corresponding total reflection angle difference is about 31.9°.

In this design, the micro lens 621 and the photodiode array 623 define a viewing angle θ for capturing the image of a contact finger in the sensing zone 615. This viewing angle can be aligned properly by controlling the physical parameters or configurations in order to detect a desired part of the cover glass surface in the sensing zone 615. For example, the viewing angle may be aligned to detect the total inner reflection of the LCD display assembly. Specifically, the viewing angle θ is aligned to sense the effective sensing zone 615 on the cover glass surface. The effective sensing cover glass surface 615 may be viewed as a mirror so that the photodetector array effectively detects an image of the fingerprint illumination light zone 613 in the LCD display that is projected by the sensing cover glass surface 615 onto the photodetector array. The photodiode/photodetector array 623 can receive the image of the zone 613 that is reflected by the sensing cover glass surface 615. When a finger touches the sensing zone 615, some of the light can be coupled into the fingerprint's ridges and this will cause the photodetector array to receive light from the location of the ridges to appear as a darker image of the fingerprint. Because the geometrics of the optical detection path are known, the fingerprint image distortion caused in the optical path in the optical fingerprint sensor module can be corrected.

Consider, as a specific example, that the distance H in FIG. 6B from the detection module central axis to the cover glass contact surface is 2 mm. This design can directly cover 5 mm of an effective sensing zone 615 with a width Wc on the cover glass. Adjusting the spacer 617 thickness can adjust the detector position parameter H, and the effective sensing zone width Wc can be optimized. Because H includes the thickness of the cover glass 431 and the display module 433, the application design should take these layers into account. The spacer 617, the micro lens 621, and the photodiode array 623 can be integrated under the color coating 619 on the bottom surface of the top transparent layer 431.

Figure 7:
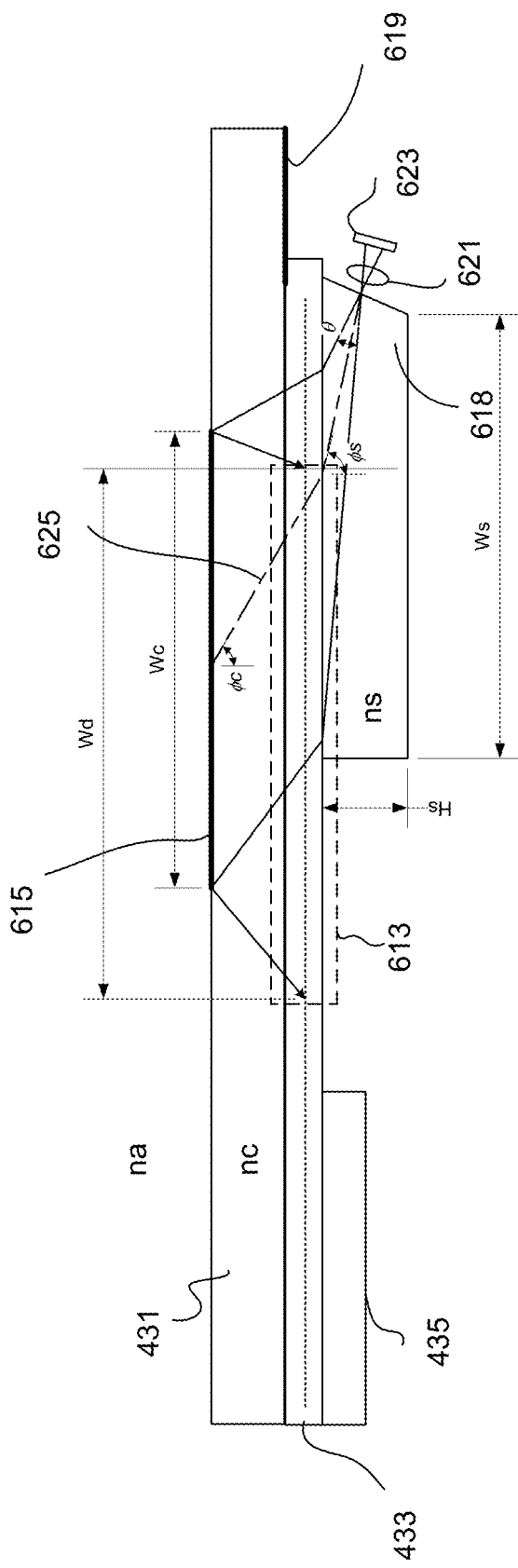

FIG. 7 shows an example of further design considerations of the optical imaging design for the optical fingerprint sensor module shown in FIGS. 6A-6C by using a special spacer 618 to replace the spacer 617 in FIGS. 6B-6C to increase the size of the sensing area 615. The spacer 618 is designed with a width Ws and thickness is Hs to have a low refraction index (RI) ns, and is placed under the LCD display module 433, e.g., being attached (e.g., glued) to the bottom surface the LCD display module 433. The end facet of the spacer 618 is an angled or slanted facet that interfaces with the micro lens 621. This relative position of the spacer and the lens is different from FIGS. 6B-6C, where the lens is placed underneath the spacer 617. The micro lens 621 and a photodiode array 623 are assembled into the optical detection module with a detection angle width θ. The detection axis 625 is bent due to optical refraction at the interface between the spacer 618 and display module 433 and at the interface between the cover glass 431 and the air. The local incident angle ϕ1 and ϕ2 are decided by the refractive indices RIs, ns, nc, and na of the materials for the components.

If nc is greater than ns, ϕ1 is greater than ϕ2. Thus, the refraction enlarges the sensing width Wc. For example, assuming the finger skin's equivalent RI is about 1.44 at 550 nm and the cover glass index RI is about 1.51, the total reflection incident angle is estimated to be about 41.8° if nothing touches the cover glass contact surface, and the total reflection angle is about 73.7° if the finger skin touches the cover glass contact surface. The corresponding total reflection angle difference is about 31.9°. If the spacer 618 is made of same material of the cover glass, and the distance from the detection module center to the cover glass contact surface is 2 mm, if detection angle width is θ=31.9°, the effective sensing area width Wc is about 5 mm. The corresponding central axis's local incident angle is ϕ1=ϕ2=57.75°. If the material for the special spacer 618 has a refractive index ns about 1.4, and Hs is 1.2 mm and the detection module is tilted at ϕ1=70°. The effective sensing area width is increased to be greater than 6.5 mm. Under those parameters, the detection angle width in the cover glass is reduced to 19°. Therefore, the imaging system for the optical fingerprint sensor module can be designed to desirably enlarge the size of the sensing area 615 on the top transparent layer 431.

the refractive index RI of the special spacer 618 is designed to be sufficiently low (e.g., to use $MgF_2$, $CaF_2$, or even air to form the spacer), the width Wc of the effective sensing area 615 is no longer limited by the thickness of the cover glass 431 and the display module 433. This property provides desired design flexibility. In principle, if the detection module has a sufficient resolution, the effective sensing area may even be increased to cover the entire display screen.

Since the disclosed optical sensor technology can be used to provide a large sensing area for capturing a pattern, the disclosed under-screen optical fingerprint sensor modules may be used to capture and detect not only a pattern of a finger but a larger size patter such a person's palm that is associated with a person for user authentication.

Figure 8A:
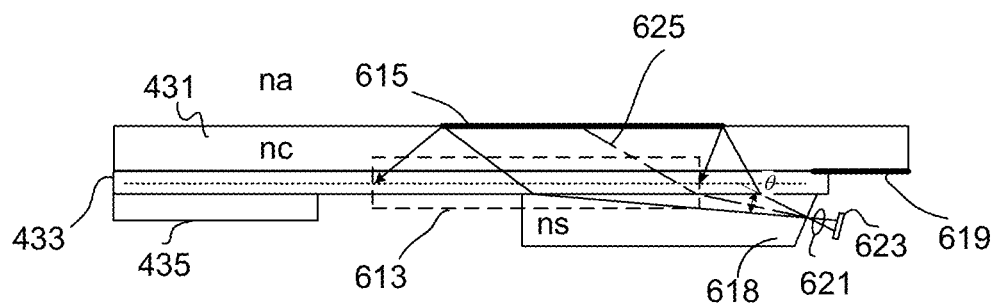
Figure 8B:
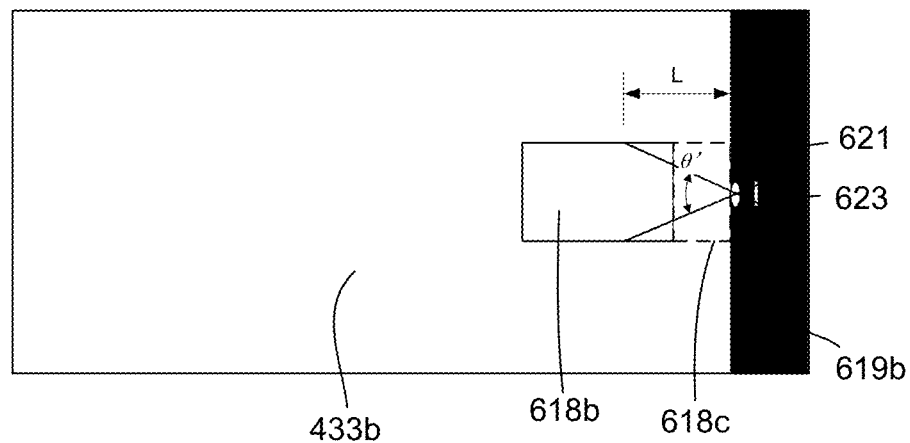

FIGS. 8A-8B show an example of further design considerations of the optical imaging design for the optical fingerprint sensor module shown in FIG. 7 by setting the detection angle θ' of the photodetector array relative in the display screen surface and the distance L between the lens 621 and the spacer 618. FIG. 8A shows a cross-sectional view along the direction perpendicular to the display screen surface, and FIG. 8B shows a view of the device from either the bottom or top of the displace screen. A filling material 618c can be used to fill the space between the lens 621 and the photodetector array 623. For example, the filling material 618c can be same material of the special spacer 618 or another different material. In some designs, the filling material 618c may the air space.

Figure 9:
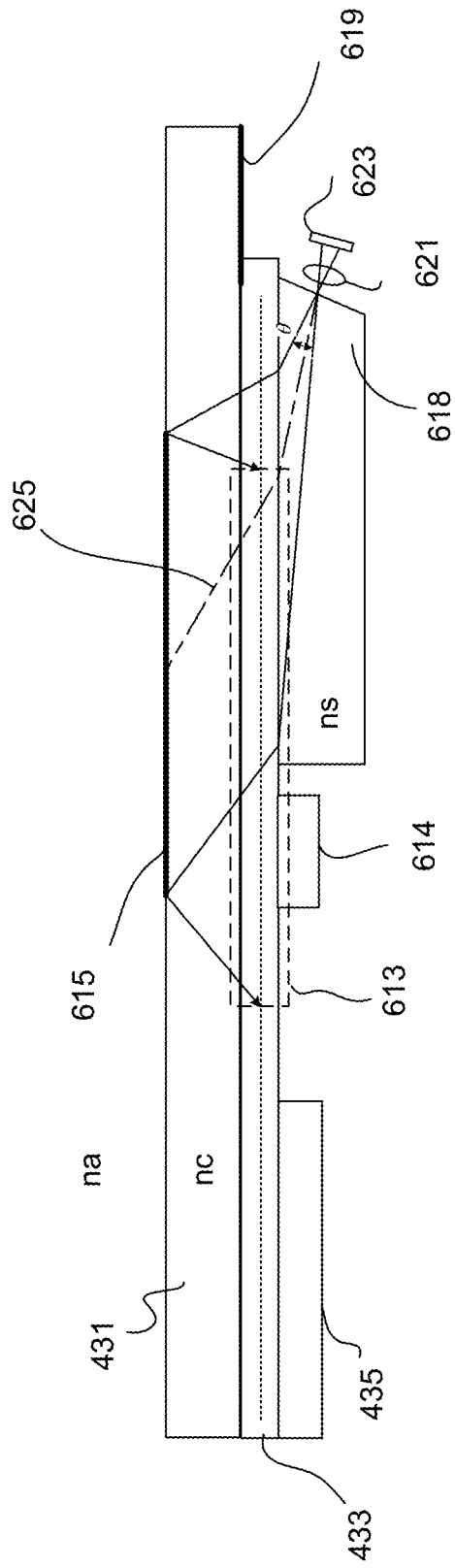

FIG. 9 shows another example of an under-screen optical fingerprint sensor module based on the design in FIG. 7 where one or more illumination light sources 614 are provided to illuminate the contact surface sensing zone 615 for optical fingerprint sensing. The illumination light sources 614 may be of an expanded type, or be a collimated type so that all the points within the effective sensing zone 615 is illuminated. The illumination light sources 614 may be a single element light source or an array of light sources.

Figure 10A:
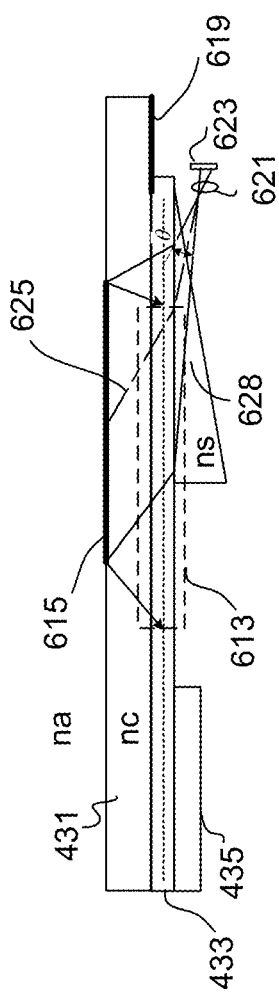
Figure 10B:
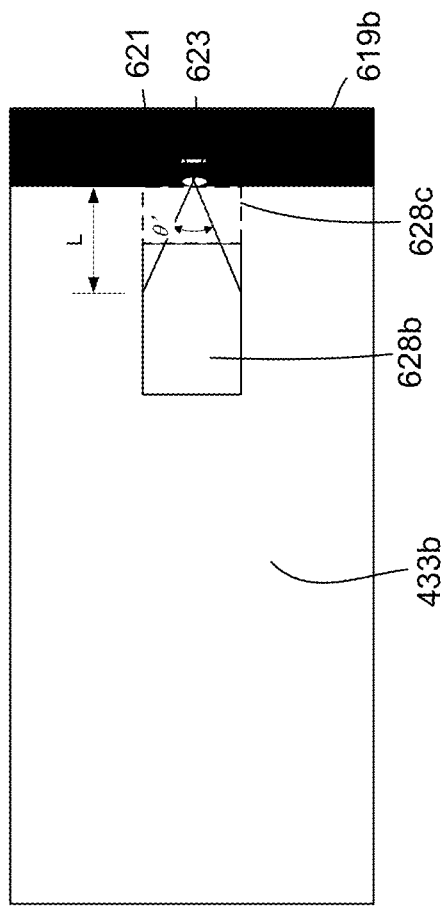

FIGS. 10A-10B show an example of an under-screen optical fingerprint sensor module that uses an optical coupler 628 shaped as a thin wedge to improve the optical detection at the optical sensor array 623. FIG. 10A shows a cross section of the device structure with an under-screen optical fingerprint sensor module for fingerprint sensing and FIG. 10B shows a top view of the device screen. The optical wedge 628 (with a refractive index ns) is located below the display panel structure to modify a total reflection condition on a bottom surface of the display panel structure that interfaces with the optical wedge 628 to permit extraction of light out of the display panel structure through the bottom surface. The optical sensor array 623 receives the light from the optical wedge 628 extracted from the display panel structure and the optical imaging module 621 is located between the optical wedge 628 and the optical sensor array 623 to image the light from the optical wedge 628 onto the optical sensor array 623. In the illustrated example, the optical wedge 628 includes a slanted optical wedge surface facing the optical imaging module and the optical sensing array 623. Also, as shown, there is a free space between the optical wedge 628 and the optical imaging module 621.

If the light is totally reflected at the sensing surface of the cover glass 431, the reflectance is 100%, of the highest efficiency. However, the light will also be totally reflected at the LCD bottom surface 433b if it is parallel to the cover glass surfaces. The wedge coupler 628 is used to modify the local surface angle so that the light can be coupled out for the detection at the optical sensor array 623. The micro holes in the LCD display module 433 provide the desired light propagation path for light to transmit through the LCD display module 433 for the under-screen optical sensing. The actual light transmission efficiency may gradually be reduced if the light transmission angle becomes too large or when the TFT layer becomes too thick. When the angle is close to the total reflection angle, namely about 41.8° when the cover glass refractive index is 1.5, the fingerprint image looks good. Accordingly, the wedge angle of the wedge coupler 628 may be adjusted to be of a couple of degrees so that the detection efficiency can be increased or optimized. If the cover glass' refractive index is selected to be higher, the total reflection angle becomes smaller. For example, if the cover glass is made of Sapphire which refractive index is about 1.76, the total reflection angle is about 34.62°. The detection light transmission efficiency in the display is also improved. Therefore, this design of using a thin wedge to set the detection angle to be higher than the total reflection angle, and/or to use high refractive index cover glass material to improve the detection efficiency.

In some under-screen optical fingerprint sensor module designs (e.g., those illustrated in FIGS. 6A-6C, 7, 8A, 8B, 9, 10A, and 10B), the sensing area 615 on the top transparent surface is not vertical or perpendicular to the detection axis 625 of the optical fingerprint sensor module so that the image plane of the sensing area is also not vertical or perpendicular to the detection axis 625. Accordingly, the plane of the photodetector array 623 can be tilted relative the detection axis 625 to achieve high quality imaging at the photodetector array 623.

FIGS. 11A-11C show three example configurations for this tilting. FIG. 11A shows the sensing area 615a is tilted and is not perpendicular the detection axis 625. In FIG. 11B, the sensing area 615b is aligned to be on the detection axis 625, such that its image plane will also be located on the detection axis 625. In practice, the lens 621 can be partially cut off so as to simplify the package. In various implementations, the micro lens 621 can also be of transmission type or reflection type. For example, a specified approach is illustrated in FIG. 11C. The sensing area 615c is imaged by an imaging mirror 621a. A photodiode array 623b is aligned to detect the signals.

In the above designs where the lens 621 is used, the lens 621 can be designed to have an effective aperture that is larger than the aperture of the holes in the LCD display layers that allow transmission of light through the LCD display module for optical fingerprint sensing. This design can reduce the undesired influence of the wiring structures and other scattering objects in the LCD display module.

Figure 12:
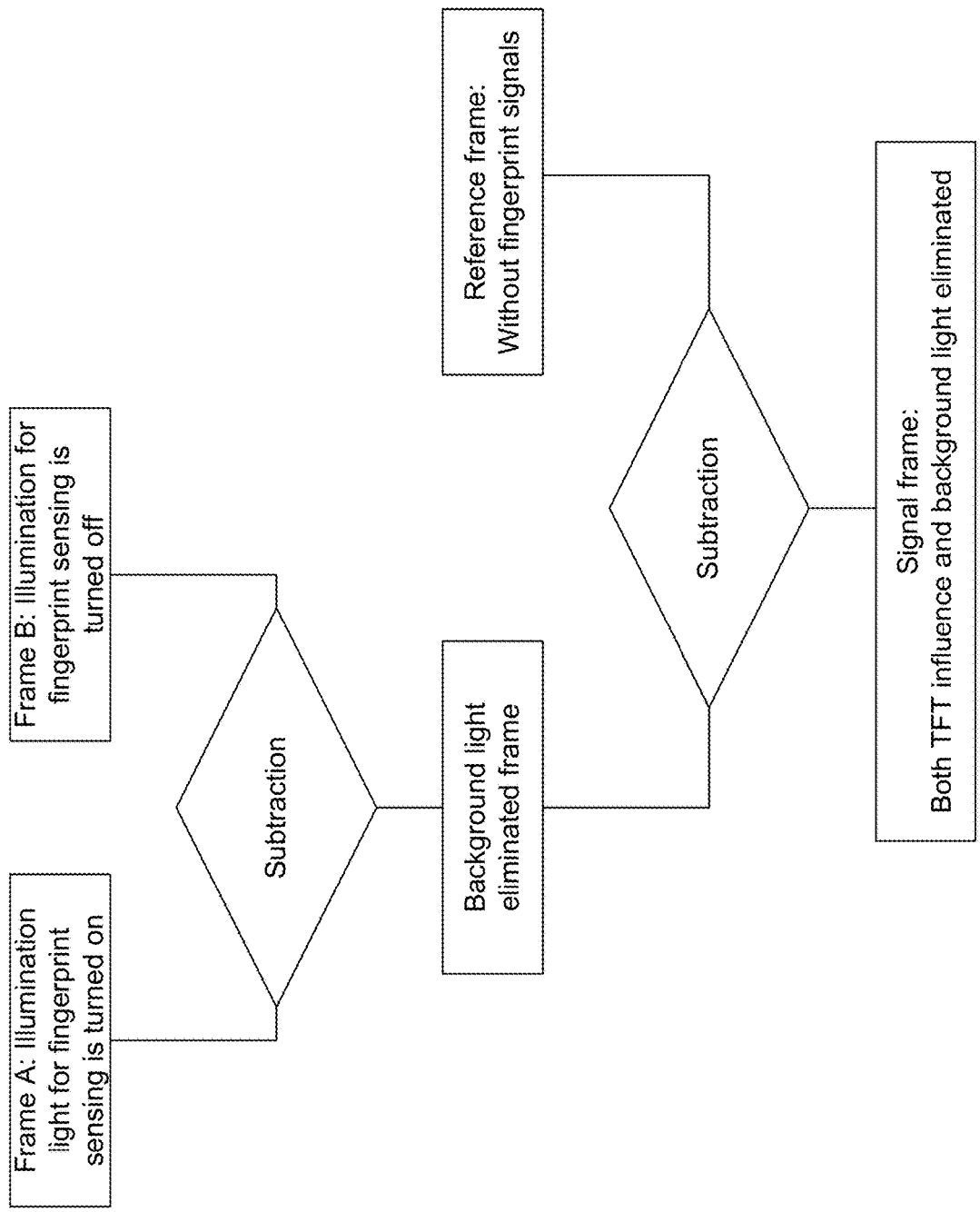
FIG. 12 is a flowchart illustrating an exemplary operation of a fingerprint sensor for reducing or eliminating undesired contributions from the background light in fingerprint sensing according to some embodiments.

FIG. 12 shows an example of an operation of the fingerprint sensor for reducing or eliminating undesired contributions from the background light in fingerprint sensing. The optical sensor array can be used to capture various frames and the captured frames can be used to perform differential and averaging operations among multiple frames to reduce the influence of the background light. For example, in frame A, the illumination light source for optical fingerprint sensing is turned on to illuminate the finger touching area, in frame B the illumination is changed or is turned off. Subtraction of the signals of frame B from the signals of frame A can be used in the image processing to reduce the undesired background light influence.

The undesired background light in the fingerprint sensing may also be reduced by providing proper optical filtering in the light path. One or more optical filters may be used to reject the environment light wavelengths, such as near IR and partial of the red light etc. In some implementation, such optical filter coatings may be made on the surfaces of the optical parts, including the display bottom surface, prism surfaces, sensor surface etc. For example, human fingers absorb most of the energy of the wavelengths under ~580 nm, if one or more optical filters or optical filtering coatings can be designed to reject light in wavelengths from 580 nm to infrared, undesired contributions to the optical detection in fingerprint sensing from the environment light may be greatly reduced.

Figure 13:
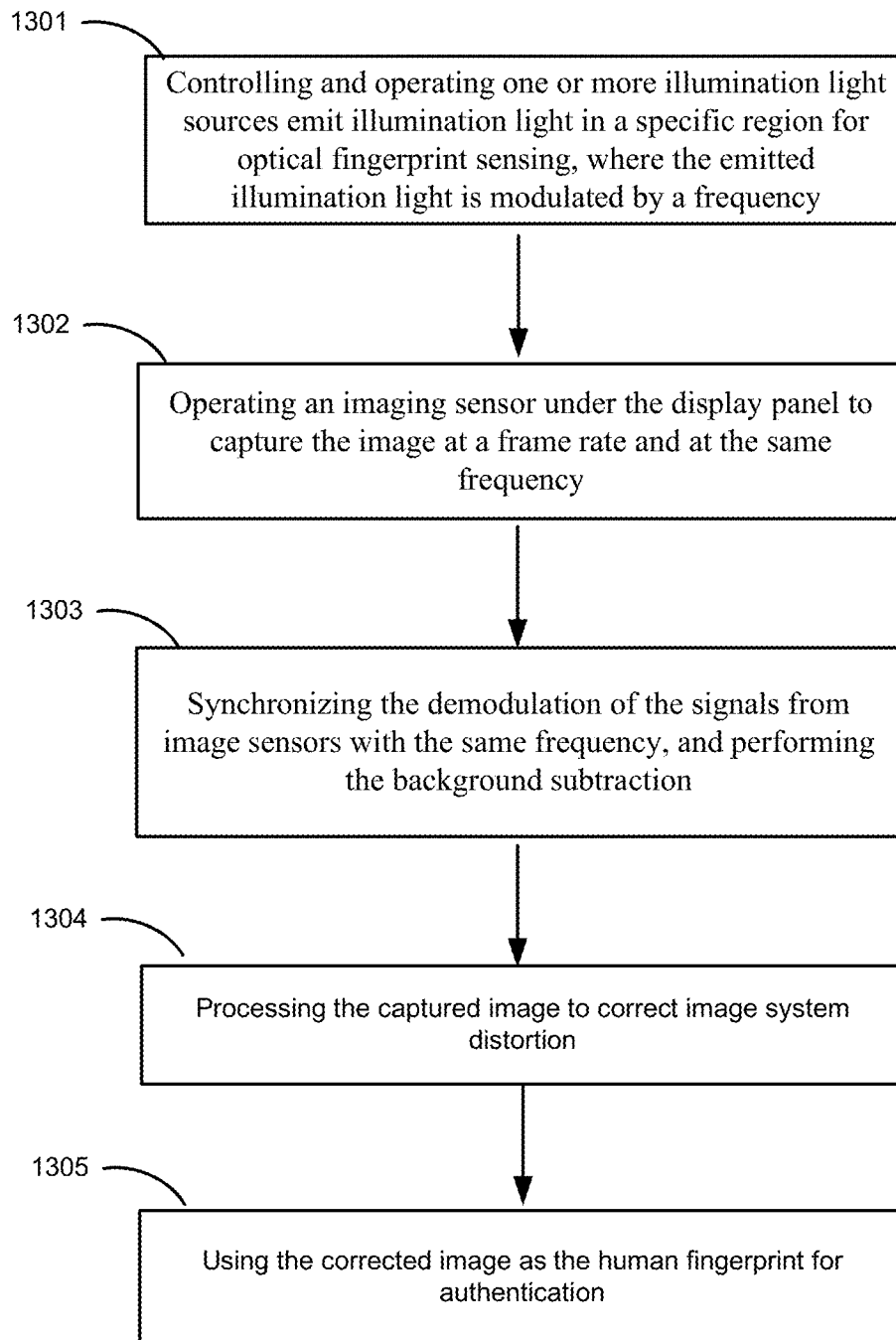
FIG. 13 is a flowchart illustrating an exemplary process for operating an under-screen optical fingerprint sensor module for capturing a fingerprint pattern according to some embodiments.

FIG. 13 shows an example of an operation process for correcting the image distortion in the optical fingerprint sensor module. At step 1301, the one or more illumination light sources are controlled and operated to emit light in a specific region, and the light emission of such pixels is modulated by a frequency F. Ate step 1302, an imaging sensor under the display panel is operated to capture the image at frame rate at same frequency F. In the optical fingerprint sensing operation, a finger is placed on top of the display panel cover substrate and the presence of the finger modulates the light reflection intensity of the display panel cover substrate contact surface. The imaging sensor under the display captures the fingerprint modulated reflection light pattern. At step 1303, the demodulation of the signals from image sensors is synchronized with the frequency F, and the background subtraction is performed. The resultant image has a reduced background light effect and includes images from pixel emitting lights. At step 1304, the capture image is processed and calibrated to correct image system distortions. At step 1305, the corrected image is used as a human fingerprint image for user authentication.

The same optical sensors used for capturing the fingerprint of a user can be used also to capture the scattered light from the illuminated finger as shown by the back scattered light 191 in FIG. 5A. The detector signals from the back scattered light 191 in FIG. 5A in a region of interest can be integrated to produce an intensity signal. The intensity variation of this intensity signal is evaluated to determine other parameters beyond the fingerprint pattern, e.g., the heart rate of the user or inner topological tissues of a finger associated with the external fingerprint pattern.

III. ANTI-SPOOFING BASED ON DETECTING PIXEL SPREADING

Many optical fingerprint sensors, including those fingerprint sensors described above, are susceptible to certain types of hacking. Such a sensor may be hacked by malicious individuals who can obtain the authorized user's fingerprint, and copy the stolen fingerprint pattern on a carrier object that resembles a human finger. For example, a malicious individual can place his finger on top of, or inside, a spoofing device made of transparent material; then, the individual can place the transparently overlaid finger in a scanning area of an optical scanner to spoof the scanner. The transparent material may have a fingerprint pattern printed thereon, or otherwise incorporated thereon. Such a spoofing technique can be used, for example, to bypass sensors that detect both optical signatures (e.g., from the ridges and valleys of a fingerprint) and liveness features (e.g., multispectral imaging to detect blood flow or other live skin characteristics, bio-capacitance, etc.). In such cases, the transparent overlay can provide the ridge and valley features, while a live finger provides the liveness features. Such spoofing can be used on fingerprint sensors to unlock a targeted device, or the like.

Hence, a fingerprint pattern, although a unique biometric identifier, may not be by itself a completely reliable or secure identification. Embodiments of optical sensors described herein, including those implemented as underscreen optical fingerprint sensor modules, can be configured for optical anti-spoofing, for example, to detect whether an input object with fingerprint patterns is an authentic finger from a living person (e.g., as opposed to the fingerprint input being a fingerprint spoofing attack). In some embodiments, such optical anti-spoofing is integrated within the optical sensor, without providing separate sensors. The optical anti-spoofing can provide high-speed responses without compromising the overall response speed of the fingerprint sensing operation.

Figure 14A:
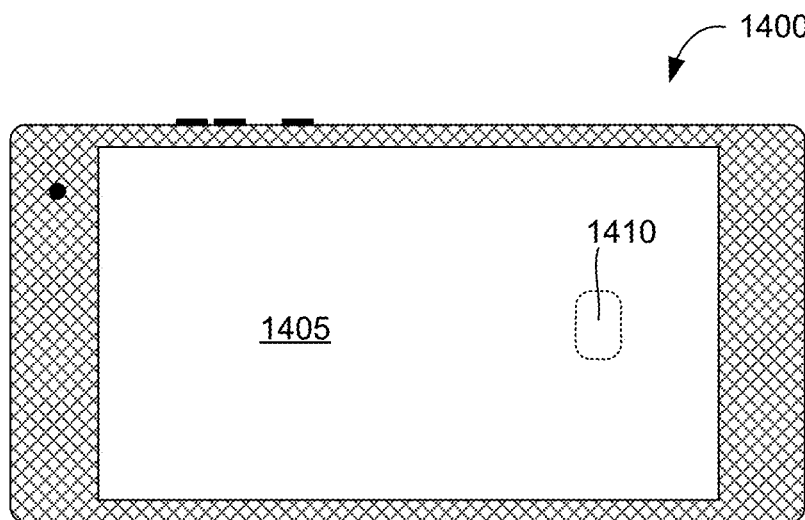
FIG. 14A shows an illustrative portable electronic device having an under-display optical sensing module integrated therein.
Figure 14B:
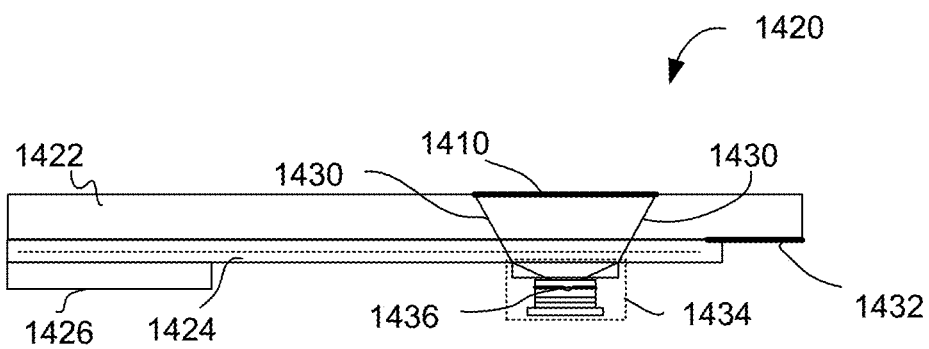
FIG. 14B shows a cross-section of an illustrative under-display optical sensing environment having an under-display optical sensing module disposed beneath a display, such as an OLED or AMOLED display.
Figure 14C:
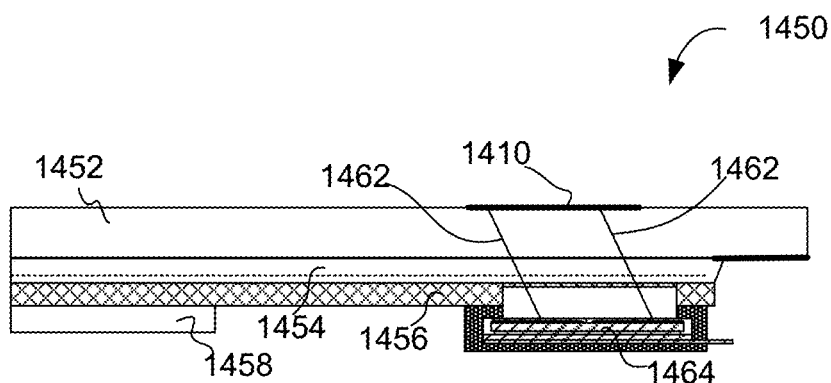
FIG. 14C shows a cross-section of another illustrative under-display optical sensing environment having an under-display optical sensing module disposed beneath a display, such as an OLED or AMOLED display.

For the sake of context, FIGS. 14A-C show examples of optical sensing environments implemented as under-display optical sensing environments, such as those described above. FIG. 14A shows an illustrative portable electronic device 1400 having an under-display optical sensing module integrated therein. As illustrated, the under-display optical sensing module can be under any suitable type of display 1405, such as an organic light-emitting diode (OLED), organic electroluminescent diode (OELD), or active-matrix OLED (AMOLED) display. Based on the position and configuration of the under-display optical sensing module and/or other components (e.g., layers of the under-display optical sensing module, etc.), an optical sensing window 1410 is formed. For example, the optical sensing window 1410 is a region of the display 1405 in which optical sensing can be performed.

FIG. 14B shows a cross-section of an illustrative under-display optical sensing environment 1420 having an under-display optical sensing module 1434 disposed beneath a display, such as an OLED or AMOLED display. The under-display optical sensing module 1434 is directly under the optical sensing window 1410 in the illustrated implementation and includes various components, such as a micro lens 1436. The display can include a transparent cover layer 1422 (e.g., cover glass), an optical array module (e.g., OLED array module) 1424, and display electronics 1426. As shown, the configuration provides a field of view 1430 for sensing using the under-display optical sensing module 1434, which may be substantially coextensive with the optical sensing window 1410. One feature of such a configuration is that the field of view 1430 is a cone shaped solid angle. Thus, there can be viewing directions that are not vertical to the display surface.

FIG. 14C shows a cross-section of another illustrative under-display optical sensing environment 1450 having an under-display optical sensing module 1464 disposed beneath a display, such as an OLED or AMOLED display. The under-display optical sensing module 1464 is under the optical sensing window 1410 in the illustrated implementation and includes various components. The display can include a transparent cover layer 1452 (e.g., cover glass), an optical array module (e.g., OLED array module) 1454, an array protection layer 1456, and display electronics 1458. As shown, the configuration provides a field of view 1462 for sensing using the under-display optical sensing module 1464, which may be substantially coextensive with the optical sensing window 1410. In such an implementation, a micro lens array or pinhole array can be applied to form the image of the target on the cover glass 1452 surface. One feature of such an implementation is that the field of view 1462 is tilted with a particular angle.

Figure 15:
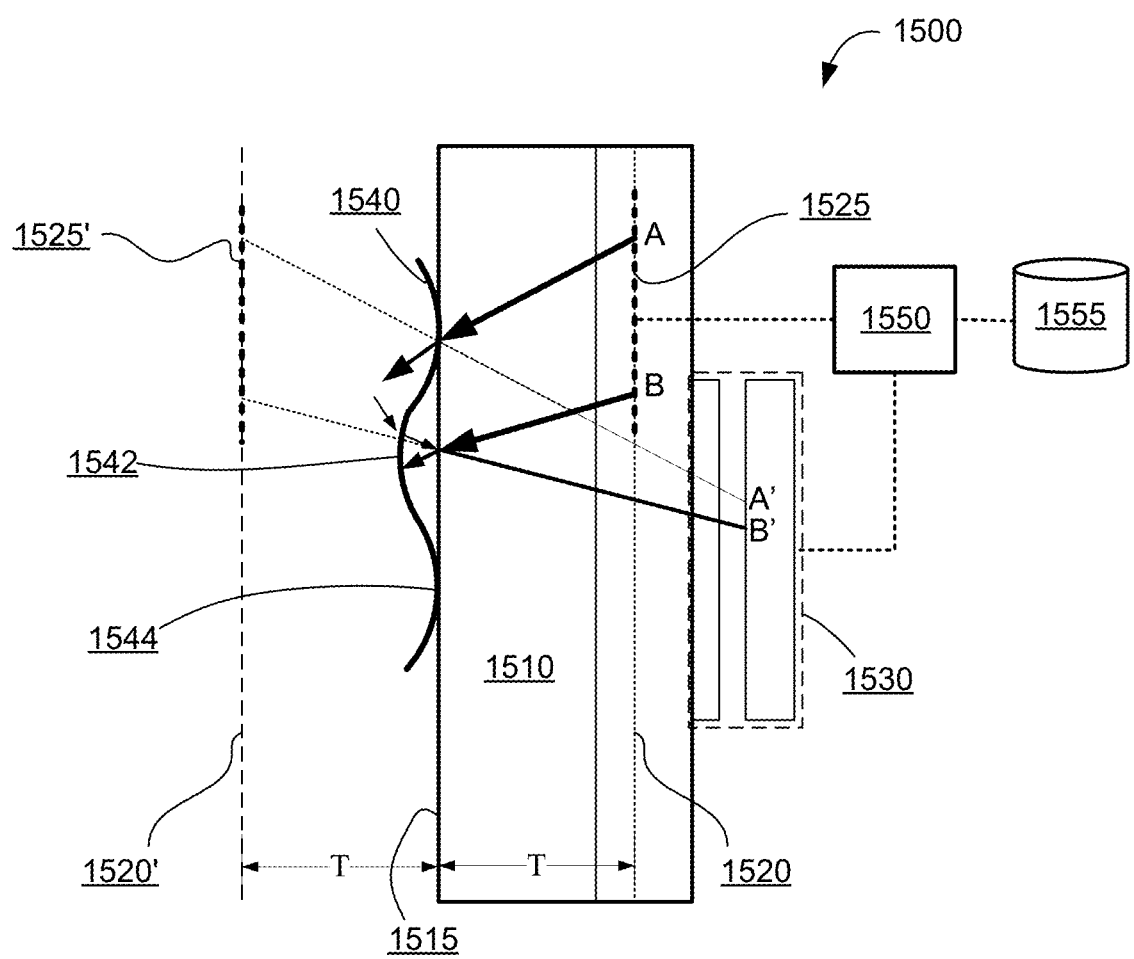
FIG. 15 illustrates certain principles of operation of optical sensing environment having an optical sensing module in context with a non-spoof object, according to various embodiments.

FIG. 15 illustrates certain principles of operation of optical sensing environment 1500 having an optical sensing module 1530 in context with a non-spoof object, according to various embodiments. The illustration of environment 1500 is simplified to include only those components that add to the clarity of the description. As illustrated in FIG. 15, the environment 1500 (e.g., optical sensing system or assembly) can include a cover layer 1510, an illumination subsystem 1520, an optical sensor module 1530, a processor 1550, and a data store 1555. The environment 1500 can also include a multi-layer display module, frames and/or other supporting structure, and/or various additional optical components (e.g., wave guides, diffusers, etc.).

The cover layer 1510 can be implemented as an embodiment of cover layer 1422 of FIG. 14B, cover layer 1452 of FIG. 14C, or any other suitable cover layer. In some implementations, the cover layer 1510 is a glass layer having a precise thickness and index of refraction. The cover layer may also be configured to provide a contact surface 1515 onto which an object (e.g., fingertip) can be placed for optical scanning. The contact surface 1515 can further be configured for use with touch-sensitive display features, and/or other features.

Embodiments of the illumination subsystem 1520 are configured to direct illumination through the cover layer 1510 to cause reflected light to reach the optical sensor module 1530, which is disposed below the cover layer 1510. The illumination subsystem 1520 can be implemented as, or can include, an array 1525 of discrete illumination sources, such as OLEDs. The array 1525 can be any suitable size and/or shape with any suitable number of elements. In some embodiments, the illumination subsystem 1520 can be controlled (e.g., by the processor 1550) to selectively activate a partial array. The processor 1550 can communicate instructions (e.g., signals) to the illumination subsystem 1520 to activate the entire array 1525 (e.g., all the illumination sources), or part of the array (e.g., all but a certain subset of the illumination sources). For example, activating a partial array can cause there to be a defined region (e.g., a rectangle, or the like) of illumination sources that are not directing illumination at the cover layer 1510, such that a corresponding portion of the contact surface 1515 is not receiving direct illumination. This can effectively create what is referred to herein as a "masked" or "marked" region of the cover layer 1510 that is not being directly illuminated, and an "unmasked" or "unmarked" region of the cover layer 1515 that is being directly illuminated. Such masking can be implemented in any suitable manner. For example, the illumination subsystem 1520 can be configured with an illumination layer and a masking layer; and masking is implemented by activating all the illumination sources in the illumination layer and activating certain masking elements to block the light from certain of the illumination sources. As used herein, the array 1525 (or "full array," "entire array," or the like) refers to the full set of illumination sources used to cover a defined sensing area of the contact surface 1515. In some cases, the contact surface 1515 is larger than the defined sensing region, and/or the illumination subsystem 1520 includes illumination sources to direct illumination at regions of the contact surface 1515 outside the sensing region; so that the array 1525 is only a portion of the entire set of illumination sources of the illumination subsystem 1520.

The cover layer 1510 is configured so that the reflected light is internally reflected by (at) the contact surface 1515 of the cover layer 1510 in a bright-dark pattern corresponding to contact between a three-dimensional feature pattern of an object 1540 and the contact surface 1515. For example, the object 1540 is a fingertip having a fingerprint, and the fingerprint has valleys 1542 and ridges 1544. When the finger is placed on the contact surface 1515, the ridges 1544 contact the contact surface 1515, and the valleys do not contact the contact surface 1515. As such, the pattern of valleys 1542 and ridges 1544 form the three-dimensional feature pattern. Embodiments of the optical sensor module 1530 can be implementations of the optical sensing module 1434 of FIG. 14B, the optical sensing module 1464 of FIG. 14C, or any other suitable optical sensing module. The optical sensor module 1530 is disposed below the cover layer 1510 and is configured to receive at least a portion of the reflected light in accordance with the bright-dark pattern caused by the three-dimensional feature pattern.

For example, the array 1525 of the illumination subsystem 1520 (OLED array) illuminates the contact surface 1515 of the cover layer 1510 with incident light. The contact surface 1515 reflects the incident light. Effectively, the internal reflection of the array 1525 by the contact surface 1515 forms an equivalent reflected array 1525' (a reflection image). The optical sensor module 1530 effectively captures the equivalent reflected array 1525' image. In regions of no contact (e.g., a fingerprint valley 1542), the incident rays of illumination that illuminate that region tend to reflect back (as reflected rays), forming a bright image. Because the contact surface 1515 is flat and smooth, the relation between a particular illumination source (e.g., an OLED pixel) and its image as captured by the optical sensor module 1530 tends to follow specular reflection law on the contact surface 1515. In contrast, in regions of contact (e.g., a fingerprint ridge 1544), the incident rays of illumination that illuminate that region tend to scatter, forming a dark image. Thus, ridges 1544 physically contact the touch surface, such that specular reflectance at those positions of contact are greatly reduced. In the resulting image detected by the optical sensor module 1530, the ridge 1544 areas create lower brightness while the valley 1542 areas create higher brightness (the specular reflected light is typically brighter than the scattered light); resulting in the bright-dark pattern.

Embodiments of the optical sensor module 1530 are implemented as an array of optical sensor elements. For example, the array of sensor elements can be a charge-coupled device (CCD) array, or the like. The array of optical sensor elements can be configured, so that illumination by particular illumination elements of an illumination array of the illumination subsystem 1520 have a specular correspondence with particular sensing elements of the sensor array of the optical sensor module 1530. For example, a particular sensor element can be configured to receive a reflected ray originating as an incident ray from a corresponding illumination source under specular conditions (e.g., when there is no contact at the reflecting location, such as when there is no object in contact with the contact surface 1515, when there is a fingerprint ridge in that location, etc.). For the sake of illustration, FIG. 15 shows two light rays. A first light ray originates at location A (e.g., at a first illumination source, illumination pixel, illumination array element, etc.) as an incident light ray, undergoes specular reflection at a first particular location of the contact surface 1515, and is received as a reflected light ray at location A' (e.g., at a first sensor pixel, sensor array element, etc.). Similarly, a second light ray originates at location B as an incident light ray, undergoes specular reflection at a second particular location of the contact surface 1515, and is received as a reflected light ray at location B' (e.g., at a second sensor pixel, sensor array element, etc.). In some embodiments, as described herein, the light ray originating at location A interacts with the fingerprint ridge 1544 and tends to scatter due to the changed interface condition at the contact surface 1515. Even in such a case, the disclosure herein considers there to be a specular correspondence between locations A and A'. One reason is that were the finger to be removed, the light ray traveling from location A to location A' would undergo specular reflection in a substantially identical manner to that of the light ray traveling from location B to location B'. Another reason is that, even though there is some scattering, there remains some specular reflection that follows specular laws, such that some light energy from the incident ray leaving location A will arrive at location A' after specular reflection at the contact surface (other energy from the light ray will scatter).

Masking of the array 1525 of the illumination subsystem 1520 causes only a portion of the contact surface 1515 to be directly illuminated. Even those portions of the contact surface 1515 that are not directly illuminated, however, tend to receive some illumination, such as diffuse illumination. As such, the entire sensing region of the contact surface 1515 tends to receive indirect (e.g., diffuse) illumination and tends to produce non-specular reflection. However, specular reflection tends only to occur in the directly illuminated, unmasked region of the contact surface 1515. As a result, the optical information received by the optical sensor module 1530 includes a masked region of the bright-dark pattern received responsive to a first portion of the reflected light reaching the optical sensor module 1530 (i.e., an optical sensor of the optical sensor module 1530) only by non-specular reflection, and an unmasked region of the bright-dark pattern received responsive to a second portion of the reflected light reaching the optical sensor by both specular reflection of the illumination and non-specular reflection.

Embodiments of the processor 1550 can include any suitable type of processor or processors, such as one or more general purpose processors, application-specific processors, state machines, etc. The processor 1550 can direct operation of the illumination subsystem 1520 and/or the optical sensor module 1530. For example, the processor 1550 can direct the illumination subsystem 1520 to selectively provide full illumination with the array 1525 of illumination sources or partial (masked) illumination with only a portion of the array 1525. The processor 1550 can also implement imaging-related features, spoof detection features, biometric features, etc. In some embodiments, the processor 1550 generates a feature image including at least a first image portion generated from the masked region of the bright-dark pattern. In some implementations, the feature image further includes some or all of the unmasked region of the bright-dark pattern. The processor 1550 can then detect a two-dimensional spoof object by analyzing the feature image to determine whether there is pixel spreading, as described herein.

Embodiments of the processor 1550 can be in communication with one or more data stores 1555 to facilitate such detection. In some embodiments, a data store 1555 is a non-transient data store (e.g., solid state memory) that has previously acquired images stored thereon. In such embodiments, the feature image generated by the processor from the reflected light can be compared against the stored, previously acquired images to see whether there is a match. As described herein, images of objects overlaid by transparent spoofs may show pixel spreading as compared to reference images or other reference data. In some embodiments, the optical sensor module 1530 receives redirected illumination from the contact surface 1515 of the cover layer 1510 responsive to incident illumination in an optical response pattern corresponding to a three-dimensional feature set of an object (e.g., a finger) in contact with the contact surface 1515. The processor 1550 can be coupled with the optical sensor module 1530 and configured to generate a feature image from the redirected illumination according to the optical response pattern. The processor 1550 can also obtain an expected optical response (e.g., from a data store 1555) based on the defined specular correspondence between the plurality of sensor pixels and the plurality of illumination pixels. As described above, the expected optical response can be based on how incident light should undergo specular reflection in response to the object being in direct contact with the contact surface 1515. For example, the expected optical response can include or represent a previously acquired image of the non-spoof object placed directly in contact with the contact surface 1515. As another example, the expected optical response can include or represent the specular response of a particular illumination pattern if the non-spoof object were placed in direct contact with the contact surface 1515 (or if nothing is placed in contact with the contact surface 1515). The processor 1550 can then detect a transparent fake object overlay by detecting pixel spreading between the expected optical response and the feature image, as described herein.

In other embodiments, the data store 1555 can include transient or non-transient storage for temporary storage of images collected during a same acquisition session. For example, while a person has her finger placed on the contact surface 1515, the processor 1550 can acquire multiple images in multiple frames under multiple conditions. In one implementation of such an embodiment, a single acquisition session has at least two acquisition frames. In a first acquisition frame, the processor 1550 directs the illumination subsystem 1520 to fully illuminate the capture region of the contact surface 1515, and uses reflected light received by the optical sensor module 1530 under that full-illumination condition to generate a full-illumination image. In a second acquisition frame, the processor 1550 directs the illumination subsystem 1520 to partially illuminate the capture region of the contact surface 1515 (leaving a masked region to be illuminated only indirectly), and uses reflected light received by the optical sensor module 1530 under that partial-illumination condition to generate the feature image. The first acquisition frame can be before or after the second acquisition frame (i.e., the images can be generated in any suitable order). In another implementation of such an embodiment, a single acquisition session has a rapid succession of acquisition frames, where some portion of the acquisition frames use full illumination to generate full-illumination images, and the remaining portion of the acquisition frames use partial illumination to generate partial-illumination (masked) images. Various illumination conditions, including masking, can be used to enhance detection of pixel spreading.

Figure 16:
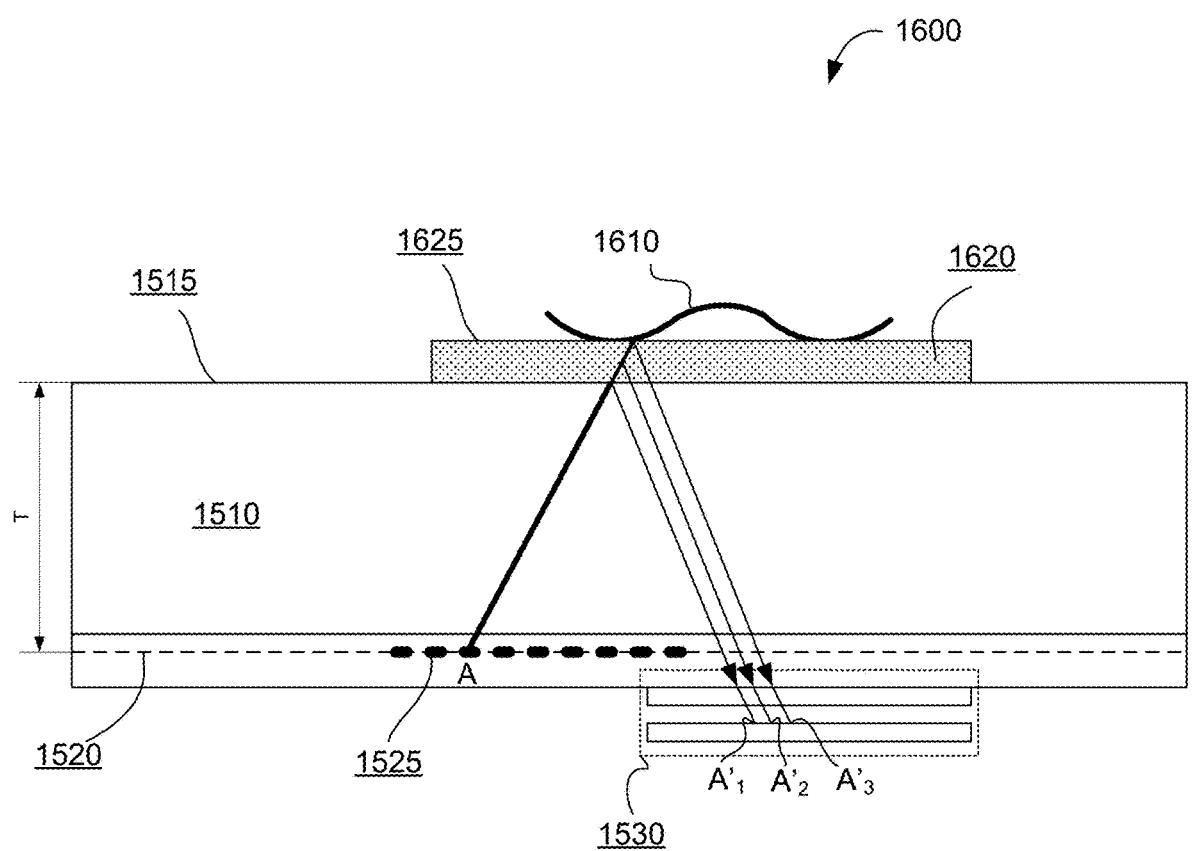
FIG. 16 shows an optical sensing environment having an optical sensing module in context of a transparent spoof overlaid on an object, according to various embodiments.

FIG. 16 shows an optical sensing environment 1600 having an optical sensing module 1530 in context of a transparent spoof overlaid on an object, according to various embodiments. For context, the environment 1600 of FIG. 16 shows the cover layer 1510 with a three-dimensional object 1610 separated from the contact surface 1515 of the cover layer 1510 by a transparent spoof overlay material 1620 (e.g., a glove, tape, etc.). As used herein, the term transparent is intended generally to include any amount of transparency or opacity that generates the effect described herein. Such an effect may still occur if the material is partially translucent, transparent only to certain wavelengths of light, etc.; and any such condition is considered transparent as used herein.

The contact surface 1515 is configured so that incident light undergoes specular reflection at the contact surface 1515. For example, three-dimensional features of a non-spoof object (e.g., fingerprint ridges and valleys) create a pattern of locations on the contact surface 1515 with different refraction interfaces. For example, at a valley, the contact surface 1515 is at a transition between the material of the cover layer 1510 (e.g., glass) and the air; while at a ridge, the contact surface 1515 is at a transition between the material of the cover layer 1510 (e.g., glass) and the material of the object (e.g., skin of a finger). These differences can determine whether incident light rays tend primarily to reflect or scatter at a particular location. Two-dimensional features (e.g., darker and lighter areas of a printed copy of a fingerprint representing ridges and valleys) can also impact some implementations. For example, a dark area and a light area (or a transparent area and an opaque area, where printed on a transparent material) can have different optical impacts on incident light; one tending to result in more specular reflection, and the other tending to result in more scattering. These various optical responses at the contact surface 1515 can result in a bright-dark pattern of optical information being received by the optical sensor module 1530 that corresponds to the pattern of features.

As described with reference to FIG. 15, the overall system can be configured for specular correspondence between illumination pixels and sensor pixels. As such, an incident light ray originating at an illumination pixel in location A undergoes specular reflection at the contact surface 1515 and is received by a sensor pixel at location A'. When a non-spoof object (e.g., 1610, assumed to be non-transparent to the incident illumination) is directly in contact with the contact surface 1515 (i.e., not separated by the transparent spoof overlay material 1620), the non-spoof object does not tend to produce additional specular reflection, and the specular correspondence is maintained. However, when the transparent spoof overlay material 1620 is added, the top surface 1625 of the transparent spoof overlay material 1620 can become another specular reflection interface. As such, as illustrated in FIG. 16, an incident light ray originating at the illumination pixel in location A still undergoes specular reflection at the contact surface 1515 (though only partially), thereby causing a corresponding reflected light ray to be received by the sensor pixel at location A' (now A'1). Additionally, the same incident light ray can scatter within the transparent spoof overlay material 1620 potentially causing a corresponding reflected light ray to be received by at least another sensor pixel at location A'2 (e.g., and other locations), and the same incident light ray can undergo further specular reflection at the top surface 1625 of the transparent spoof overlay material 1620 causing a corresponding reflected light ray to be received by yet another sensor pixel at location A'3.

In effect, the optical information produced by incident light ray A (e.g., reflect or scatter; or reflect bright or reflect dark) is spread over a larger area of sensor pixels; an effect referred to herein as pixel spreading. Notably, direct contact between the non-spoof object 1610 (e.g., a finger) and the contact surface 1515 produces a particular optical response, while presence of the transparent spoof overlay material 1620 between the contact surface 1515 and the non-spoof object 1610 produces a different optical response due to pixel spreading. Embodiments can thus detect presence of the transparent spoof overlay material 1620 by detecting such differences in optical response caused by pixel spreading.

Figure 17A:
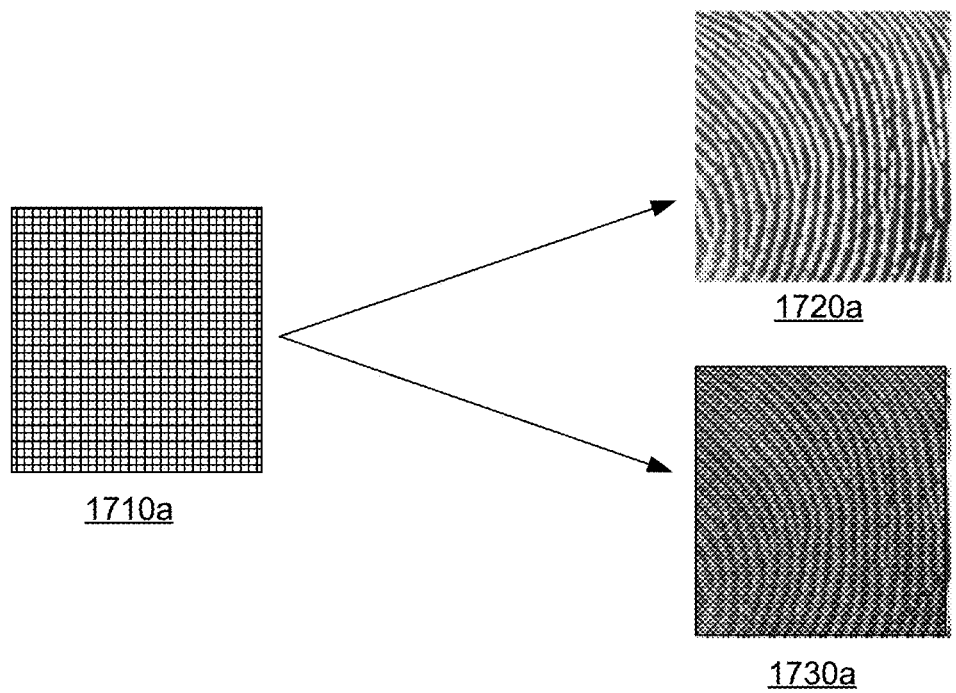
FIGS. 17A and 17B show differences in optical sensing between imaging of a fingerprint in direct contact with a contact surface of the optical sensing environment and imaging of a fingerprint separated from the contact surface of the optical sensing environment by a transparent spoof overlay material.
Figure 17B:
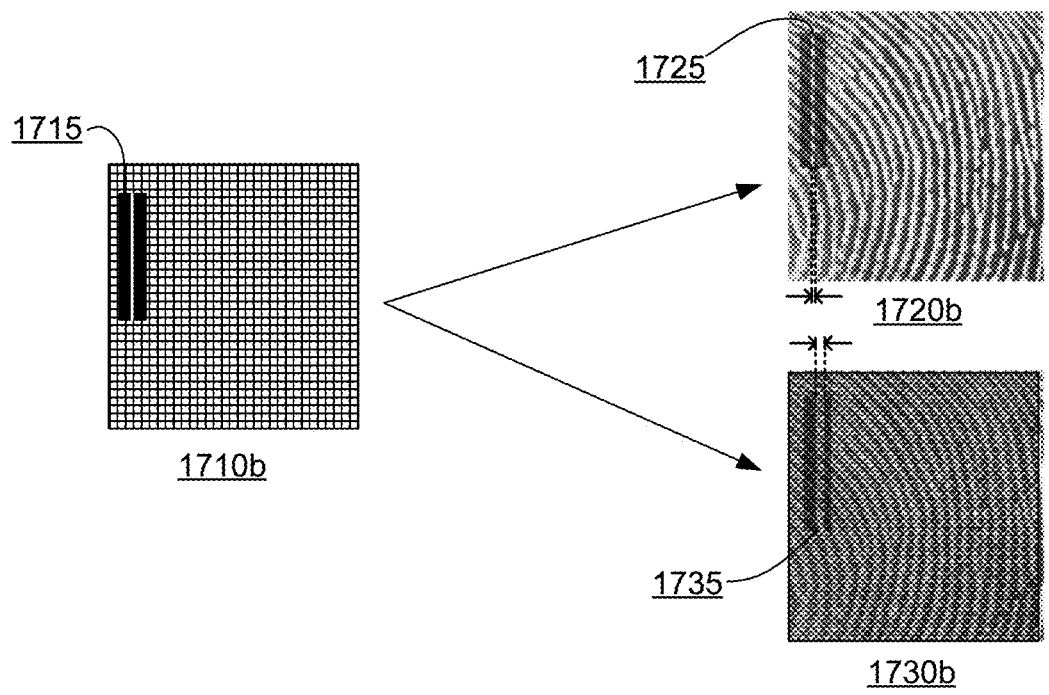

FIGS. 17A and 17B show differences in optical sensing between imaging of a fingerprint in direct contact with a contact surface of the optical sensing environment and imaging of a fingerprint separated from the contact surface of the optical sensing environment by a transparent spoof overlay material. FIG. 17A shows imaging under a condition when the illumination is full (represented by illumination array 1710*a*). For example, referring to FIGS. 15 and 16, such a condition can represent using the full array 1525 of the illumination subsystem 1520 to illuminate the sensing region of the contact surface 1515, so that the optical sensor module 1530 receives optical information by specular reflection across the entire sensing region.

Image 1720*a* represents imaging of the fingerprint in direct contact with the contact surface 1515 of the optical sensing environment. Image 1730*a* represents imaging of the same fingerprint separated from the contact surface 1515 of the optical sensing environment by a transparent spoof overlay material, such as transparent spoof overlay material 1620 of FIG. 16. As shown, image 1730*a* indicates a different optical response than that of image 1720*a* due to pixel spreading. For example, embodiments can generate the feature image (1730*a*) to include a first manifestation of at least a portion of the feature set of the object (e.g., ridges and valleys of the fingerprint). The processor 1550 can obtain the expected optical response by obtaining a reference image (e.g., 1720*a*) corresponding to the expected optical response and comprising a second manifestation of at least the portion of the feature set of the object. The processor 1550 can then detect the transparent fake object overlay by comparing the reference image and the feature image to detect pixel spreading in the portion of the feature set of the object.

It can be seen, however, that the pixel-spread image 1730*a* may still include similar feature information as in the reference image 1720*a*. As such, it may be difficult in some cases, or it may take more extensive (e.g., more time intensive, more processor-intensive, etc.) image processing to reliably discern such differences and detect pixel spreading. As shown in FIG. 17B, some embodiments use masking (or marking) as part of such detection. Such approaches can provide various features, such as an increase in detection reliability, reduction in detection time, reduction in detection processing, etc. Such masking or marking is provided by activating (e.g., by the processor 1550) only a portion of the illumination pixels to direct a marked illumination pattern 1715 at the contact surface 1515 through the cover layer 1510. The marked illumination pattern 1715 can have a predefined bright-dark illumination pattern, such that the redirected illumination is received in the optical response pattern corresponding further to the predefined bright-dark illumination pattern. The known specular correspondence between illumination pixels and sensor pixels can determine an expected optical response to the marked illumination pattern 1715, as illustrated by the reference received pattern 1725 in reference image 1720*b*. In generating the feature image 1730*b*, the transparent spoof overlay material causes pixel spreading of the marked illumination pattern 1715, which can be seen in the pixel-spread received pattern 1735.

In the illustrated example, the processor 1550 activates only the portion of the plurality of illumination pixels by selectively activating and deactivating particular rows of the illumination pixels to form the marked illumination pattern in a manner that effectively includes a bright line of the illumination pixels (e.g., a darkened region interrupted by a bright row or rows of pixels). As such, the feature image (e.g., 1730*b*) includes a first manifestation of the bright line of the illumination pixels (e.g., as part of the pixel-spread received pattern 1735), while the expected optical response (shown in image 1720*b*) includes a second manifestation of the bright line of the illumination pixels (e.g., as part of the reference received pattern 1725). The processor 1550 can detect the pixel spreading, for example, by detecting that the first manifestation is wider than the second manifestation. Such a single bright-line pattern can help reduce the processing involved in detecting pixel spreading, for example, because detection involves analyzing a relatively small amount of information in the images. However, any other suitable pattern can be used. For example, selective activation of illumination pixels can be used to generate an illumination pattern having multiple bright lines, particular shapes, etc. Reference to selective activation of the illumination pixels can generally include any suitable way of selectively directing incident light rays at the contact surface 1515 and/or selectively preventing incident light rays from reaching the contact surface 1515.

Figure 18:
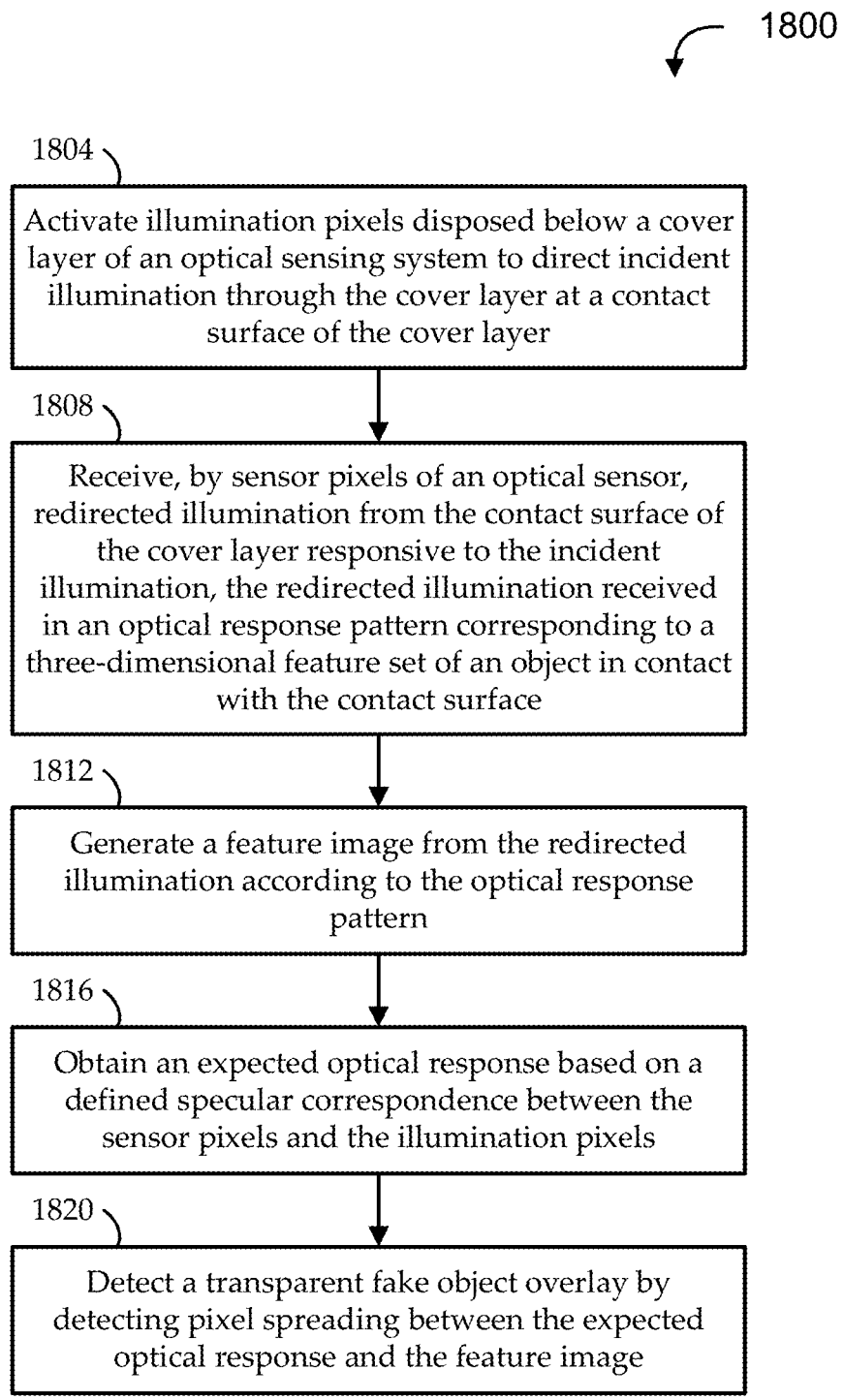
FIG. 18 shows a flow diagram of an illustrative method for anti-spoofing of transparent fake object overlays by an optical sensor, according to various embodiments.

FIG. 18 shows a flow diagram of an illustrative method 1800 for anti-spoofing of transparent fake object overlays by an optical sensor, according to various embodiments. The method 1800 can be implemented using any of the systems described above, and/or any other suitable system. Embodiments of the method 1800 begin at stage 1804 by activating illumination pixels disposed below a cover layer of an optical sensing system to direct incident illumination through the cover layer at a contact surface of the cover layer. In some embodiments, the illumination pixels include organic light emitting diodes (OLEDs).

At stage 1808, embodiments receive, by sensor pixels of an optical sensor, redirected illumination from the contact surface of the cover layer responsive to the incident illumination, the redirected illumination received in an optical response pattern corresponding to a feature set of an object in contact with the contact surface. In some embodiments, the object is a finger and the feature set of the object is a set of fingerprint ridges and fingerprint valleys of the finger. At stage 1812, embodiments can generate a feature image from the redirected illumination according to the optical response pattern.

At stag 1816, embodiments can obtain an expected optical response based on a defined specular correspondence between the sensor pixels and the illumination pixels. For example, the illumination pixels include a set of N illumination pixels, each configured to direct a respective one of N incident light rays; the sensor pixels include a set of N sensor pixels, each configured to receive a respective one of N reflected light rays; and the defined specular correspondence is between the N sensor pixels and the N illumination pixels based on each of the N reflected light rays being deterministically produced by specular reflection of a corresponding one of the N incident light rays at a respective one of N locations of the contact surface. N can be any suitable integer greater than one, such as an integer in the thousands. In some embodiments, the obtaining at stage 1816 includes retrieving the expected optical response from a non-transient memory (e.g., a previously capture image, etc.).

At stage 1820, embodiments can detect a transparent fake object overlay by detecting pixel spreading between the expected optical response and the feature image. In some embodiments, the feature image includes a first manifestation of at least a portion of the feature set of the object; the obtaining at stage 1816 includes obtaining a reference image corresponding to the expected optical response and includes a second manifestation of at least the portion of the feature set of the object; and the detecting at stage 1820 includes comparing the reference image and the feature image to detect pixel spreading in the portion of the feature set of the object. In some embodiments, the activating at stage 1804 includes activating only a portion of the plurality of illumination pixels to form a marked illumination pattern having a predefined bright-dark illumination pattern, such that the redirected illumination is received in the optical response pattern corresponding further to the predefined bright-dark illumination pattern. In some such embodiments, the expected optical response is based on prior imaging of the feature set of the object by the optical sensor using the marked illumination pattern, such that the expected optical response has a specular correspondence with the predefined bright-dark illumination pattern. In other embodiments, the activating at stage 1804 includes selectively activating and deactivating particular rows of the illumination pixels to form the marked illumination pattern to include a bright line of the illumination pixels, such that the feature image includes a first manifestation of the bright line of the illumination pixels. In some such embodiments, the expected optical response includes a second manifestation of the bright line of the illumination pixels, and the detecting at stage 1820 includes detecting that the first manifestation is wider than the second manifestation.

While this disclosure contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A recitation of "a," "an," or "the" is intended to mean "one or more" unless specifically indicated to the contrary. Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is ens and thus need to be compact to save space for the display screens and other functions while s value. Similarly, when values are expressed as approximations, by use of the antecedent "about," it will be understood that the specified value forms another embodiment. It will be further understood that the endpoints of each of the ranges are included with the range.

All patents, patent applications, publications, and descriptions mentioned here are incorporated by reference in their entirety for all purposes. None is admitted to be prior art.

What is claimed is:

1. An optical sensing system for anti-spoofing of transparent fake object overlays with an optical sensor, the system comprising:
   an illumination subsystem located below a cover layer and having a plurality of illumination pixels to direct incident illumination through the cover layer at a contact surface of the cover layer;
   an optical sensor disposed below the cover layer and comprising a plurality of sensor pixels to receive redirected illumination from the contact surface of the cover layer responsive to the incident illumination, the redirected illumination received in an optical response pattern corresponding to a feature set of an object in contact with the contact surface; and
   a processor, coupled with the optical sensor, and configured to:
   generate a feature image from the redirected illumination according to the optical response pattern;
   obtain an expected optical response based on a defined specular correspondence between the plurality of sensor pixels and the plurality of illumination pixels; and
   detect a transparent fake object overlay by detecting pixel spreading between the expected optical response and the feature image.

2. The system of claim 1, wherein:
   the plurality of illumination pixels includes a set of N illumination pixels, each configured to direct a respective one of N incident light rays;
   the plurality of sensor pixels includes a set of N sensor pixels, each configured to receive a respective one of N reflected light rays; and the defined specular correspondence is between the N sensor pixels and the N illumination pixels based on each of the N reflected light rays being deterministically produced by specular reflection of a corresponding one of the N incident light rays at a respective one of N locations of the contact surface, wherein N is an integer greater than one.

3. The system of claim 1, further comprising:

a non-transient memory, wherein the processor is configured to obtain the expected optical response by retrieving the expected optical response from the non-transient memory.

4. The system of claim 1, wherein:

the feature image comprises a first manifestation of at least a portion of the feature set of the object;

the processor is configured to obtain the expected optical response by obtaining a reference image corresponding to the expected optical response and comprising a second manifestation of at least the portion of the feature set of the object; and the processor is configured to detect the transparent fake object overlay by comparing the reference image and the feature image to detect pixel spreading in the portion of the feature set of the object.

5. The system of claim 1, wherein:

the processor is further configured to activate the plurality of illumination pixels to direct the incident illumination through the cover layer at the contact surface of the cover layer.

6. The system of claim 1, wherein:

the processor is further configured to activate only a portion of the plurality of illumination pixels to direct a marked illumination pattern at the contact surface through the cover layer, the marked illumination pattern having a predefined bright-dark illumination pattern, such that the redirected illumination is received in the optical response pattern corresponding further to the predefined bright-dark illumination pattern; and the expected optical response is based on prior imaging of the feature set of the object by the optical sensor using the marked illumination pattern, such that the expected optical response has a specular correspondence with the predefined bright-dark illumination pattern.

7. The system of claim 6, wherein:

the processor is further configured to activate only the portion of the plurality of illumination pixels by selectively activating and deactivating particular rows of the illumination pixels to form the marked illumination pattern to comprise a bright line of the illumination pixels, such that the feature image includes a first manifestation of the bright line of the illumination pixels;

the expected optical response includes a second manifestation of the bright line of the illumination pixels; and the processor is configured to detect the pixel spreading by detecting that the first manifestation is wider than the second manifestation.

8. The system of claim 1, wherein the object is a finger and the feature set of the object is a set of fingerprint ridges and fingerprint valleys of the finger.

9. The system of claim 1, wherein the plurality of illumination pixels comprises a plurality of organic light emitting diodes.

10. The system of claim 1, further comprising:
the cover layer.

11. The system of claim 10, further comprising:
a display subsystem disposed above the illumination subsystem and the optical sensor, and below the cover layer.

12. A method for anti-spoofing of transparent fake object overlays by an optical sensor, the method comprising:

activating a plurality of illumination pixels disposed below a cover layer of an optical sensing system to direct incident illumination through the cover layer at a contact surface of the cover layer;

receiving, by a plurality of sensor pixels of an optical sensor, redirected illumination from the contact surface of the cover layer responsive to the incident illumination, the redirected illumination received in an optical response pattern corresponding to a feature set of an object in contact with the contact surface;

generating a feature image from the redirected illumination according to the optical response pattern;

obtaining an expected optical response based on a defined specular correspondence between the plurality of sensor pixels and the plurality of illumination pixels; and detecting a transparent fake object overlay by detecting pixel spreading between the expected optical response and the feature image.

13. The method of claim 12, wherein:

the plurality of illumination pixels includes a set of N illumination pixels, each configured to direct a respective one of N incident light rays;

the plurality of sensor pixels includes a set of N sensor pixels, each configured to receive a respective one of N reflected light rays; and the defined specular correspondence is between the N sensor pixels and the N illumination pixels based on each of the N reflected light rays being deterministically produced by specular reflection of a corresponding one of the N incident light rays at a respective one of N locations of the contact surface, wherein N is an integer greater than one.

14. The method of claim 12, wherein the obtaining comprises retrieving the expected optical response from a non-transient memory.

15. The method of claim 12, wherein:

the feature image comprises a first manifestation of at least a portion of the feature set of the object;

the obtaining the expected optical response comprises obtaining a reference image corresponding to the expected optical response and comprising a second manifestation of at least the portion of the feature set of the object; and the detecting the transparent fake object overlay comprises comparing the reference image and the feature image to detect pixel spreading in the portion of the feature set of the object.

16. The method of claim 12, wherein:

the activating comprises activating only a portion of the plurality of illumination pixels to form a marked illumination pattern having a predefined bright-dark illumination pattern, such that the redirected illumination is received in the optical response pattern corresponding further to the predefined bright-dark illumination pattern; and the expected optical response is based on prior imaging of the feature set of the object by the optical sensor using the marked illumination pattern, such that the expected optical response has a specular correspondence with the predefined bright-dark illumination pattern.

17. The method of claim 16, wherein:
- the activating comprises selectively activating and deactivating particular rows of the illumination pixels to form the marked illumination pattern to comprise a bright line of the illumination pixels, such that the feature image includes a first manifestation of the bright line of the illumination pixels;
- the expected optical response includes a second manifestation of the bright line of the illumination pixels; and
- the detecting the pixel spreading comprises detecting that the first manifestation is wider than the second manifestation.

18. The method of claim 12, wherein the object is a finger and the feature set of the object is a set of fingerprint ridges and fingerprint valleys of the finger.

19. The method of claim 12, wherein the plurality of illumination pixels comprises a plurality of organic light emitting diodes.

20. A system for anti-spoofing of transparent fake object overlays by an optical sensor, the system comprising:
- a set of processors; and
- a processor-readable memory coupled with the set of processors and having processor-readable instructions stored thereon, which, when executed, cause the set of processors to perform steps comprising:
  - directing activating of a plurality of illumination pixels disposed below a cover layer of an optical sensing system to direct incident illumination through the cover layer at a contact surface of the cover layer;
  - directing receiving, by a plurality of sensor pixels of an optical sensor, redirected illumination from the contact surface of the cover layer responsive to the incident illumination, the redirected illumination received in an optical response pattern corresponding to a feature set of an object in contact with the contact surface;
  - generating a feature image from the redirected illumination according to the optical response pattern;
  - obtaining an expected optical response based on a defined specular correspondence between the plurality of sensor pixels and the plurality of illumination pixels; and
  - detecting a transparent fake object overlay by detecting pixel spreading between the expected optical response and the feature image.

* * * * *